Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 1

INVENTORS.
Douglas O. Baird
Raymond G. Bielenberg

BY Smith, Olsen & Baird
Attys

INVENTORS
Douglas O. Baird
Raymond G. Bielenberg
BY
Smith, Olsen & Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 3

INVENTORS
Douglas O. Baird
Raymond G. Bielenberg

BY Smith, Olsen & Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 4

INVENTORS
Douglas O. Baird
Raymond G. Bielenberg
BY Smith, Olsen & Baird
Attys.

INVENTORS
Douglas O. Baird
Raymond G. Bielenberg
BY
Smith, Olsen & Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952

14 Sheets-Sheet 6

INVENTORS
Douglas O. Baird
Raymond G. Bielenberg
BY Smith, Olsen & Baird
Attys.

INVENTORS
Douglas O. Baird
Raymond G. Bielenberg
BY Smith, Olsen + Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 8

INVENTORS
Douglas O. Baird
BY Raymond G. Bielenberg
Smith, Olsen + Baird
Attys.

Sept. 9, 1958

D. O. BAIRD ET AL 2,851,531

AUTOMATIC TELEPHONE SYSTEMS INVOLVING TOLL RECORDING FACILITIES

Filed March 12, 1952

14 Sheets-Sheet 9

INVENTORS
Douglas O. Baird
Raymond G. Bielenberg
BY
Smith, Olsen + Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 10

INVENTORS
Douglas O. Baird
Raymond G. Bielenberg

BY Smith, Olsen & Baird
Attys.

INVENTORS
Douglas O. Baird
Raymond G. Bielenberg
BY
Smith, Olsen & Baird
Attys.

Sept. 9, 1958 D. O. BAIRD ET AL 2,851,531

AUTOMATIC TELEPHONE SYSTEMS INVOLVING TOLL RECORDING FACILITIES

Filed March 12, 1952 14 Sheets-Sheet 12

INVENTORS
Douglas O. Baird
Raymond G. Bielenberg
BY Smith, Olsen & Baird
Attys.

INVENTORS
Douglas O. Baird
Raymond G. Bielenberg
BY
Smith, Olsen + Baird
Attys.

INVENTORS
Douglas O. Baird
Raymond G. Bielenberg
BY
Smith, Olsen + Baird
Attys.

2,851,531

AUTOMATIC TELEPHONE SYSTEMS INVOLVING TOLL RECORDING FACILITIES

Douglas O. Baird, Skokie, and Raymond G. Bielenberg, Berwyn, Ill., assignors to General Telephone Laboratories, Incorporated, a corporation of Delaware Application March 12, 1952, Serial No. 276,164

20 Claims. (Cl. 179—9)

Figure 1:
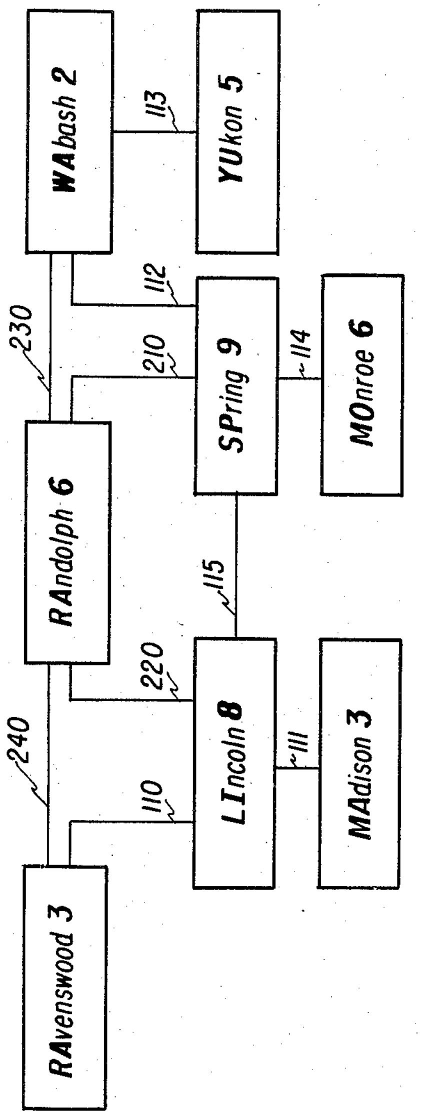

The present invention relates to automatic telephone systems involving toll recording facilities and more particularly to improved systems of the general character disclosed in the copending application of Douglas O. Baird and Raymond G. Bielenberg, Serial No. 231,728, filed June 15, 1951, now Patent No. 2,739,184, granted March 20, 1956, in which short or suburban toll calls are set-up directly by subscribers at calling subscriber substations, without the assistance of operators, and in which records are automatically produced in conjunction with such toll calls for subscriber billing purposes.

Each office of an automatic telephone system of the character noted usually comprises a plurality of trunks terminating in switching apparatus, a plurality of register-translators, and equipment responsive to the presence of a calling line for connecting the calling line to an idle one of the trunks and for connecting an idle one of the register-translators to the one trunk. The subscriber at the subscriber substation on the calling line then proceeds to dial the three office code digits of the desired or called office and the four numerical digits of the desired or called subscriber line therein. The one register-translator registers the three office code digits and determines therefrom whether the call is to be completed in the local office of the calling subscriber line or in a remote office. In the event it is determined that the call is to be completed in the local office, the register-translator is dismissed after registering the third office code digit so that the four numerical digits dialed over the calling line are effective directly to operate the switching apparatus terminating the one trunk in order to extend the connection from the one trunk to the called line in the local office. On the other hand, in the event it is determined that the call is to be completed in a remote office, the register-translator is held and later effects operation of the switching apparatus terminating the one trunk to select a trunk line extending to the remote office, or at least to a tandem office in route to the remote office, and then transmits digits over the trunk line noted so that other equipment and switching apparatus may be controlled to complete the connection to the called line in the remote office. The connection between the one trunk and the trunk line over which the toll call is completed includes equipment for accumulating items of record information in conjunction with the toll call; and facility is provided for recording the items noted for billing purposes.

A telephone system of the character noted is quite satisfactory in operation; however, the number of register-translators required in each office is rather large since a register-translator is employed in conjunction with the extension of each call regardless of whether the call ultimately proves to be a local call or a toll call.

While it has been proposed that the switching apparatus in each office be arranged so that the trunk to which the register-translator is connected is seized by the switching apparatus only in the event of the extension of a toll call from the calling line, no simple arrangement of equipment to achieve this result has been suggested due primarily to the difficulty that the trunk noted must be selected by the switching apparatus in response to certain first office code digits and in response to certain combinations of first and second office code digts and in response to certain combinations of first and second and third office code digits, and the value of each of the office code digits noted employed in the operation of the switching apparatus to seize the trunk must be recaptured and registered subsequent to operation of the switching apparatus to seize the trunk.

Accordingly, it is a general object of the present invention to provide improved apparatus for setting-up telephone connections in an automatic telephone system that employs at the calling office first and second and third groups of toll links that are respectively selected by operation of subscriber controlled automatic switching apparatus respectively in response to certain first called office code digits, to certain combinations of first and second called office code digits, and to certain combinations of first and second and third called office code digits, wherein the selected toll link is operated automatically by the mere selection thereof to recapture the one or two or three particular called office code digits employed in the selecting operation of the automatic switching apparatus, then to complete a connection therefrom to an idle trunk line extending to the called office, or at least to a tandem office in route to the called office, and then to send therefrom over the connected trunk line the recaptured one or two or three called office code digits.

Another object of the invention is to provide improved apparatus for setting-up telephone connections in an automatic telephone system of the character noted, wherein the mere selection of the toll link effects the automatic identification of the directory number of the calling subscriber line connected thereto by the automatic switching apparatus and the automatic registration therein of the digits of the directory number thus identified.

Another object of the invention is to provide improved apparatus for setting-up telephone connections in an automatic telephone system of the character noted, wherein the digits dialed over the calling subscriber line subsequent to the operation of the switching apparatus to select the toll link are registered directly in the selected toll link and then automatically repeated therefrom, as received, over the connected trunk line.

Another object of the invention is to provide improved apparatus for setting-up telephone connections in an automatic telephone system of the character noted, wherein a record is automatically made in the toll link of all of the data registered therein incident to the release of the connection routed thereby between the calling subscriber line and the connected trunk line, regardless of whether the connection is ultimately answered at the called subscriber substation in the called office.

A further object of the invention is to provide in an automatic telephone system of the character noted, an improved arrangement of the three groups of toll links into an improved trunking plan, wherein the toll links in each group are further arranged into subgroups provided with common overflow toll links, so as to achieve simplification and specialized selection of the individual toll links in the several subgroups.

A further object of the invention is to provide in an automatic telephone system of the character noted, a toll link incorporating an improved and simplified arrangement for recapturing the digit or digits of the called office code that are employed in the operation of the stitching apparatus to bring about the selection of the toll link.

Further features of the invention pertain to the particular arrangement of the circuit elements of the telephone system, whereby the above-outlined and additional operating features thereof are attained.

*Section 1.—The general arrangement of the telephone system*

Figure 13:
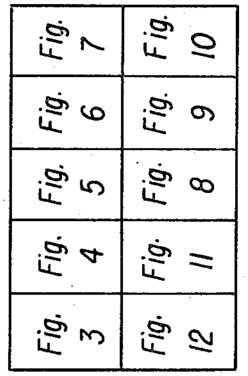
Figure 2:
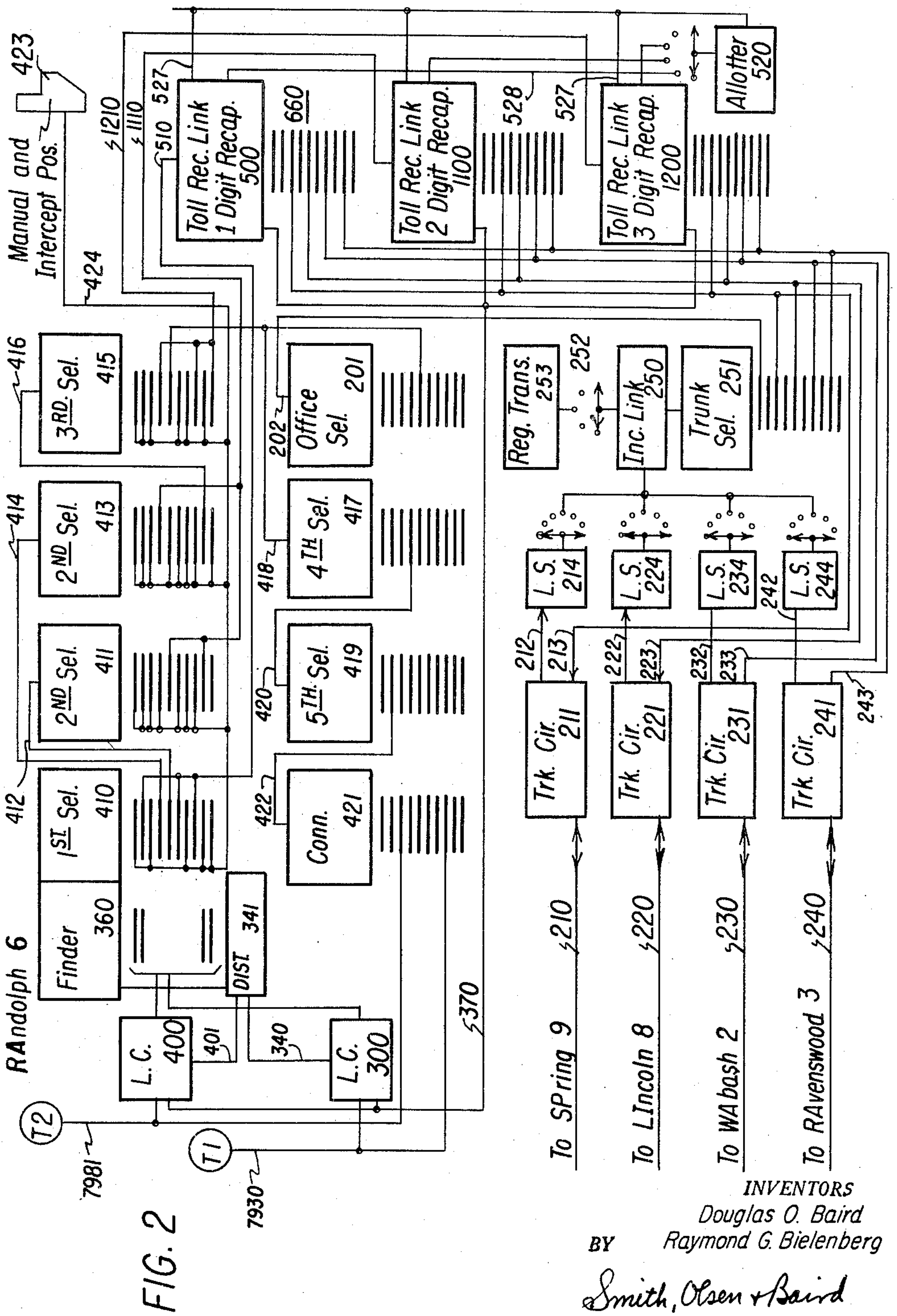
Figure 14:
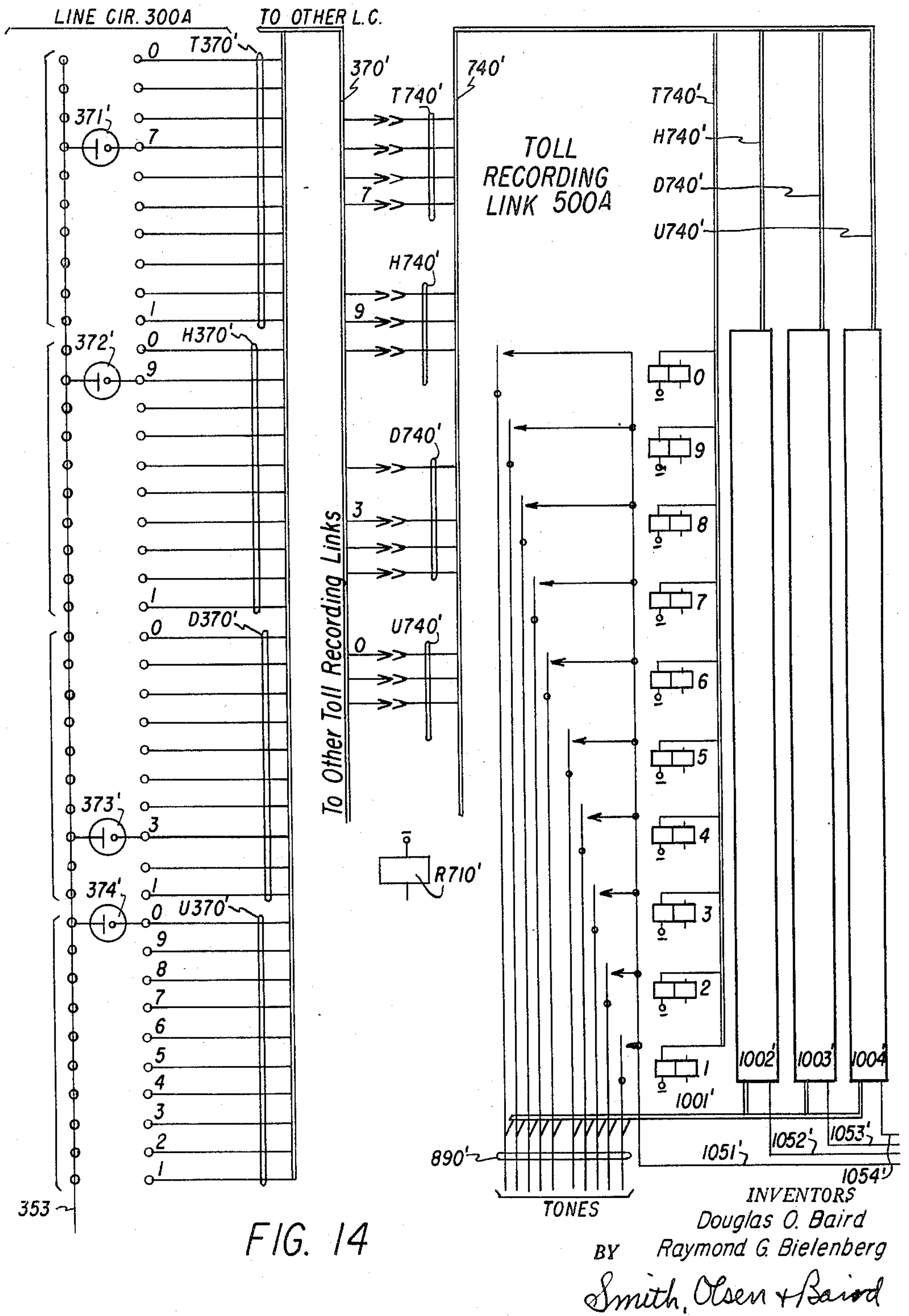
Figure 15:
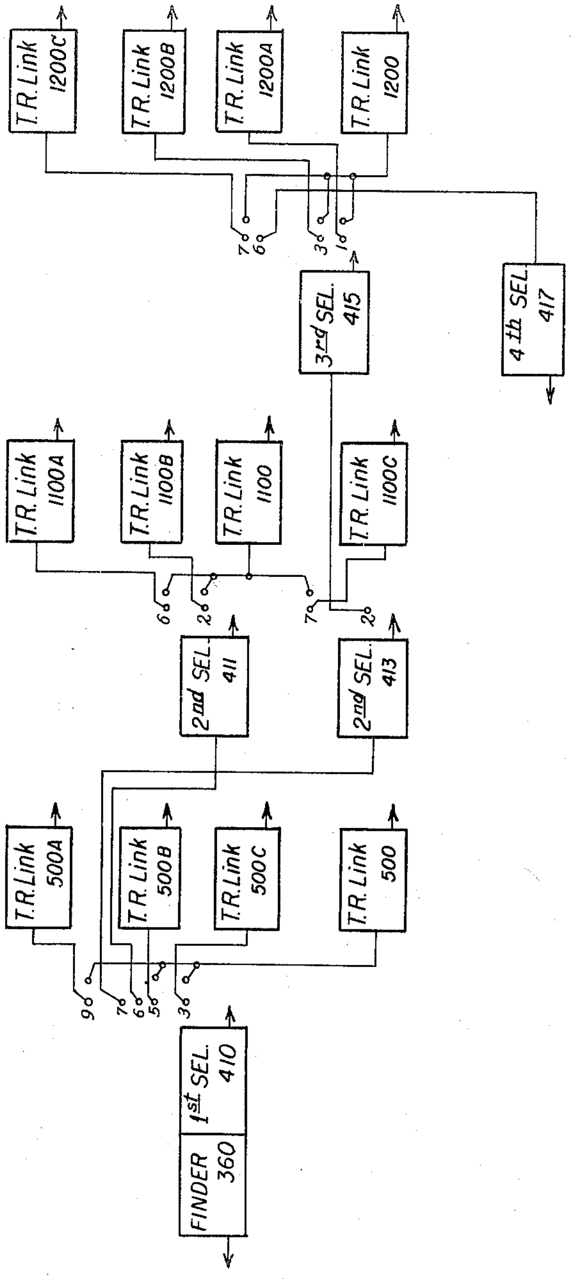

The invention, both as to its organization and method of operation, together with further objects and advantages thereof, will best be understood by reference to the following specification taken in connection with the accompanying drawings in which Figure 1 is a schematic diagram of the area served by the telephone system incorporating apparatus embodying the present invention; Fig. 2 is a schematic diagram of the general arrangement of the apparatus incorporated in one of the offices of the system shown in Fig. 1; Figs. 3–12, inclusive, taken together, illustrate the details of certain of the apparatus incorporated in the office shown in Fig. 2, which apparatus has embodied therein the features of the invention as briefly outlined above; Fig. 13 illustrates the mode of combining Figs. 3–12, inclusive, to form a unified diagram, Fig. 14 illustrates a modification in one of the line circuits and in one of the toll recording links that may be substituted in the corresponding circuits of Figs. 3 and 10, respectively; and Fig. 15 illustrates a modification in the trunking plan that may be substituted for part of that illustrated in Fig. 2.

Figure 3:
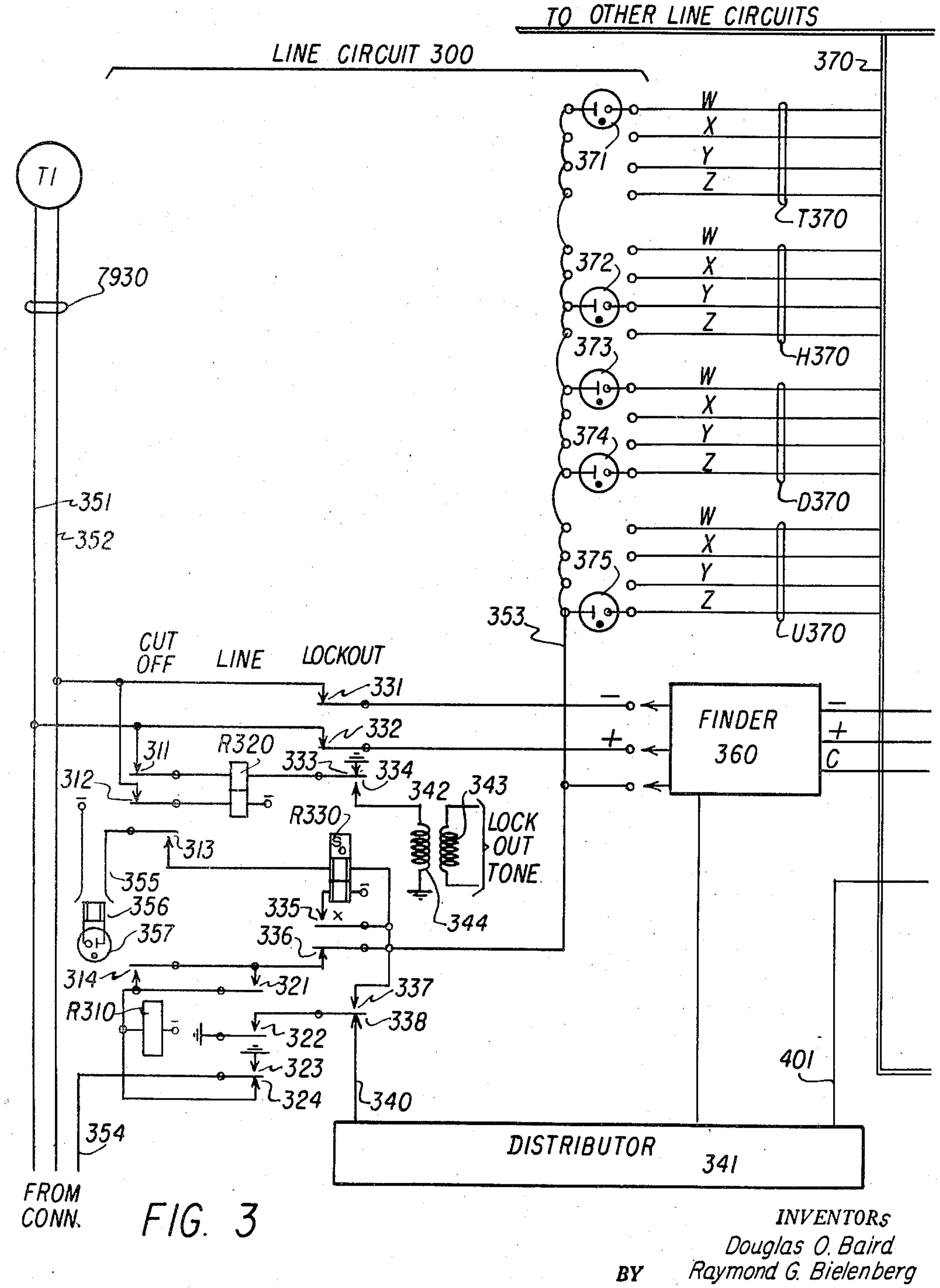
Figure 4:
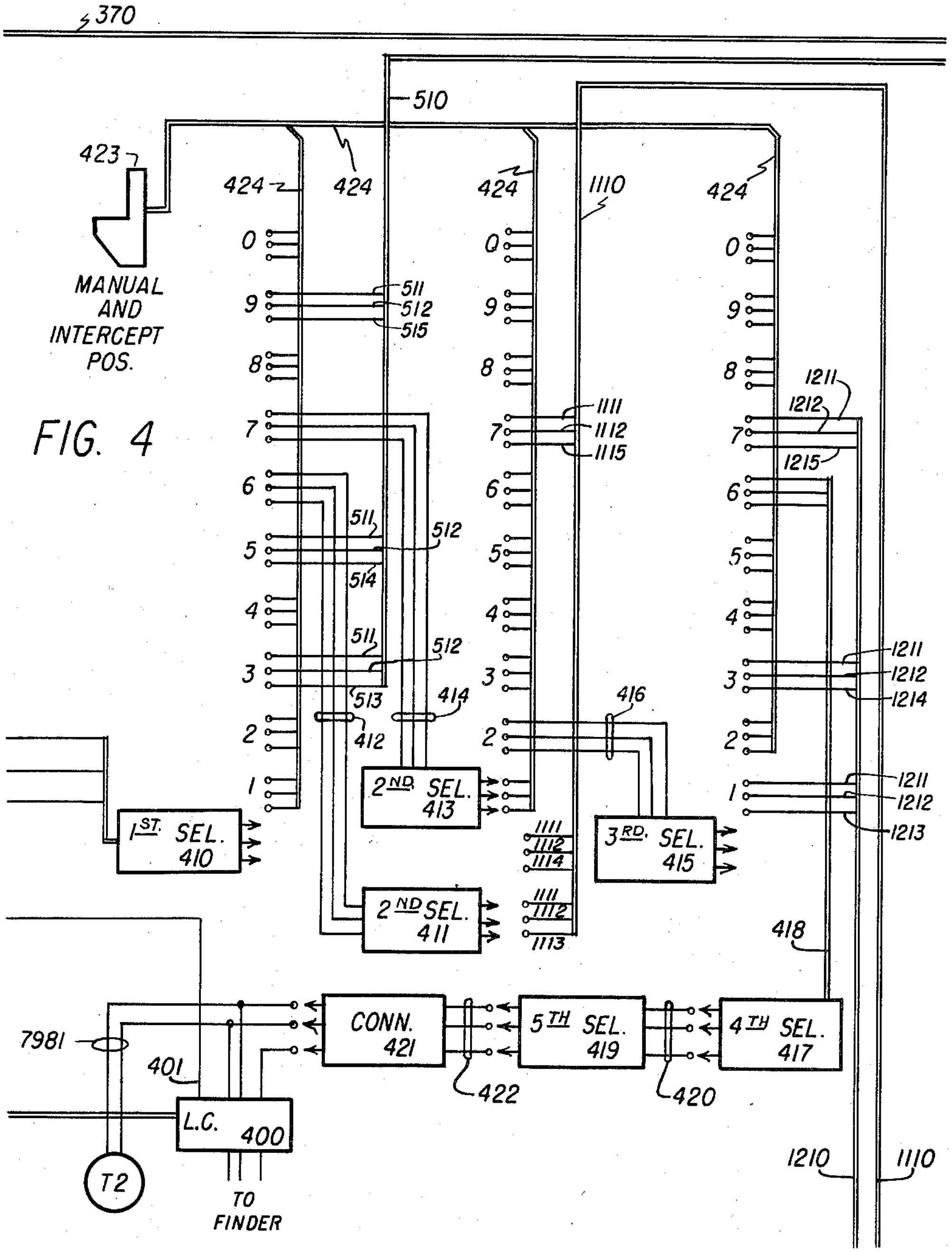
Figure 11:
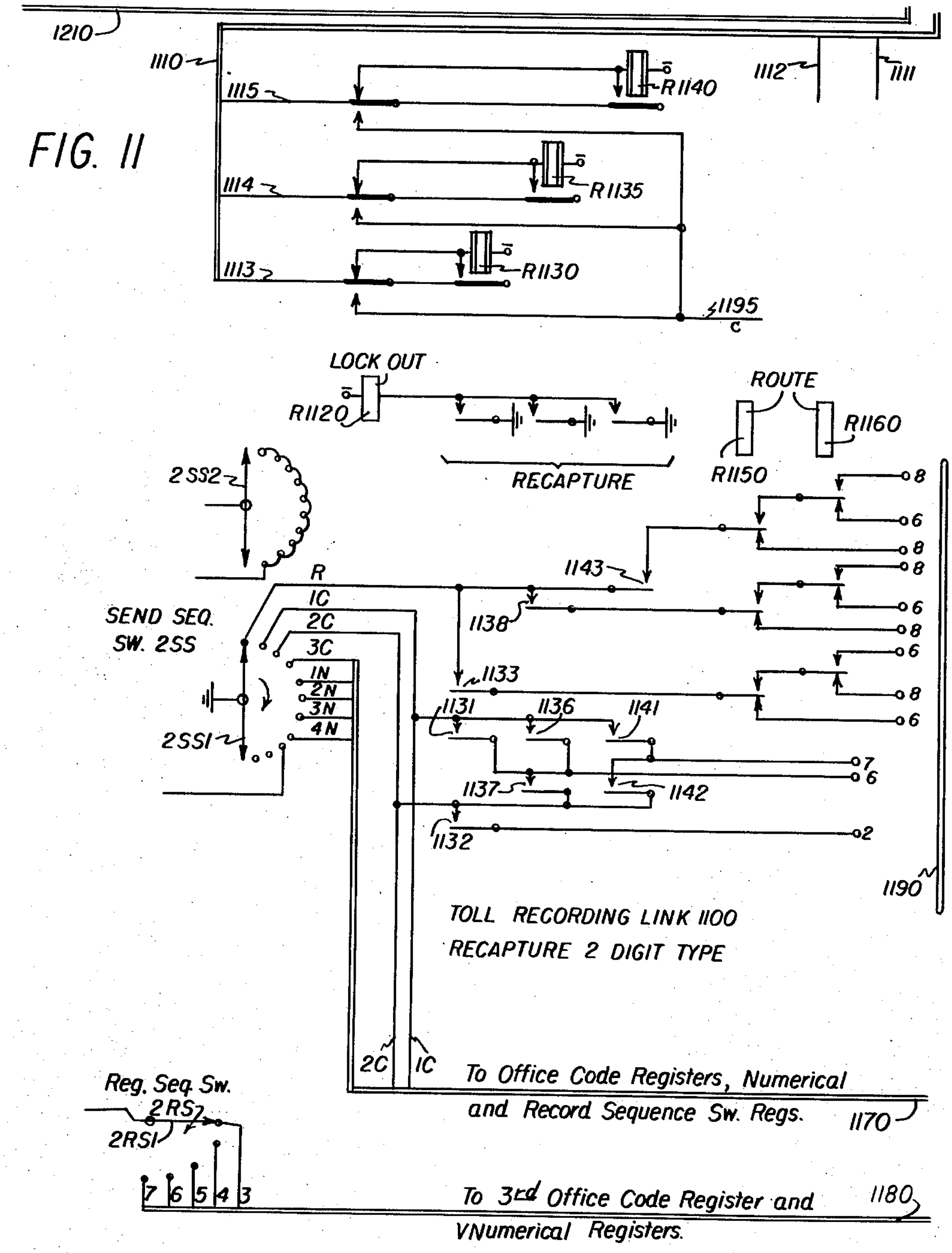
Figure 12:
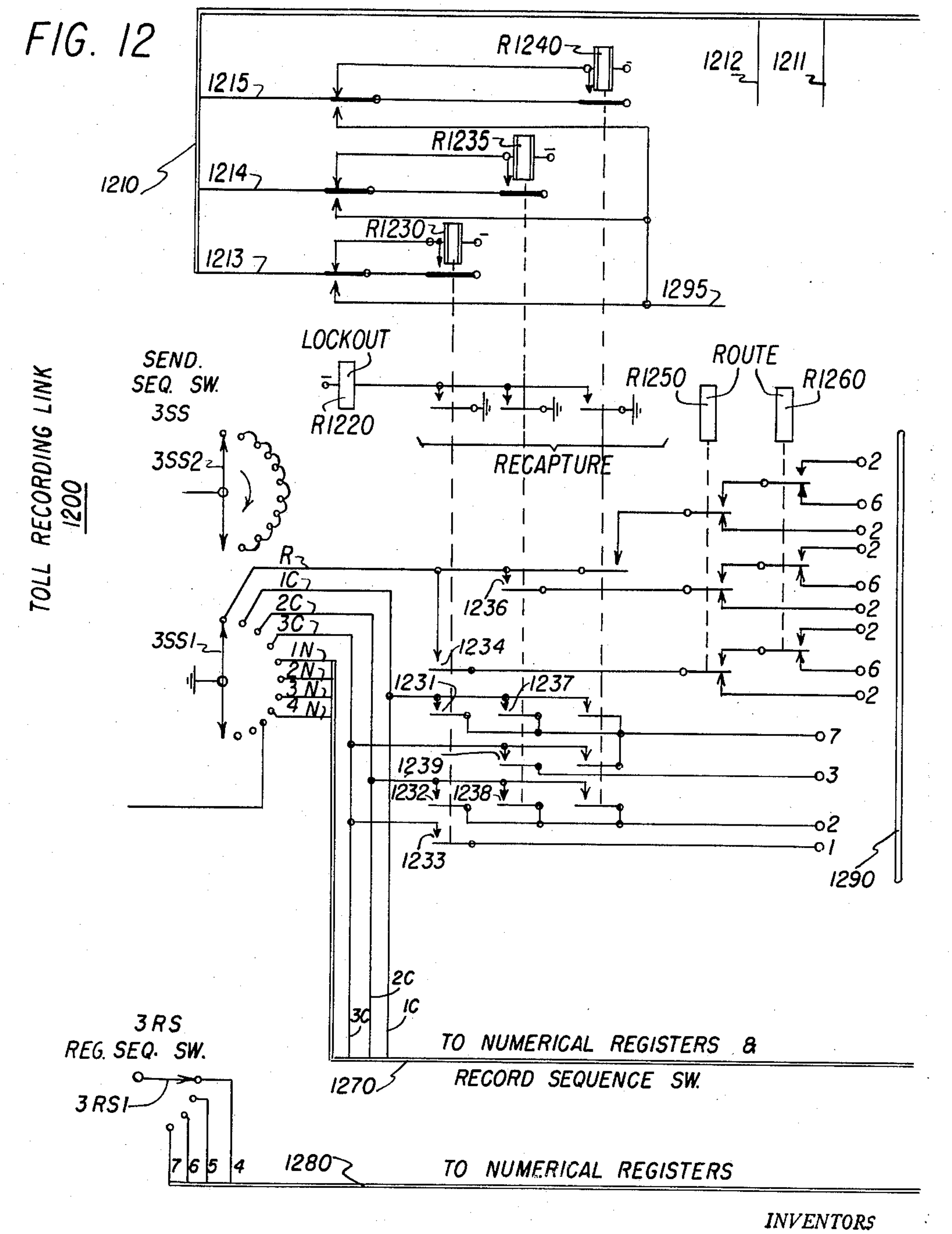

More particularly, Fig. 3 illustrates the details of one of the line circuits incorporated in the office noted; Fig. 4 illustrates the general arrangement of some of the switching apparatus incorporated in the office noted; Figs. 5 to 10, inclusive, taken together, illustrate the details of one of the toll recording links of the one-digit recapture type incorporated in the office noted; Fig. 11 illustrates the details of a fragmentary portion of one of the toll recording links of the two-digit recapture type incorporated in the office noted; and Fig. 12 illustrates the details of a fragmentary portion of one of the toll recording links of the two-digit recapture type incorporated in the office noted; and Fig. 13 illustrates the details of a fragmentary portion of one of the toll recording links of the three-digit recapture type incorporated in the office noted.

Referring now to Fig. 1, the telephone system there illustrated serves an area comprising a number of offices, eight of which are illustrated as: RAvenswood 3, RAndolph 6, WAbash 2, LIncoln 8, SPring 9, YUkon 5, MAdison 3, and MOnroe 6. Each of the offices noted is of the automatic type and serves a maximum of 10,000 subscriber lines; and each of the offices comprises apparatus for establishing local connections between the various subscriber substations therein, apparatus for extending connections from the various subscriber substations therein to the other offices, apparatus for completing connections extended from the other offices to the subscriber substation therein, and apparatus for extending tandem connections between various of the other offices. Also each of the offices comprises equipment for automatically producing toll records in conjunction with completed toll connections involving calling subscriber substations therein.

The RA3 office and the RA6 office are interconnected by a group of trunk lines, including the trunk line 240; the RA6 office and the WA2 office are interconnected by a group of trunk lines, including the trunk line 230; the RA3 office and the LI8 office are interconnected by a group of trunk lines, including the trunk line 110; the LI8 office and the RA6 office are interconnected by a group of trunk lines, including the trunk line 220; the LI8 office and the SP9 office are interconnected by a group of trunk lines, including the trunk line 115; the LI8 office and the MA3 office are interconnected by a group of trunk lines, including the trunk line 111; the RA6 office and the SP9 office are interconnected by a group of trunk lines, including the trunk line 210; the SP9 office and the WA2 office are interconnected by a group of trunk lines, including the trunk line 112, the SP9 office and the MO6 office are interconnected by a group of trunk lines, including the trunk line 114; and the WA2 office and the YU5 office are interconnected by a group of trunk lines, including the trunk line 113. In the telephone system and with reference to the RA6 office, the group of trunk lines 240, etc., comprises a first choice route to the RA3 office, while the group of trunk lines 220, etc., comprises a second choice route to the RA3 office via the LI8 office in tandem relation. Similarly, with reference to the RA6 office, the group of trunk lines 230, etc., comprises a first choice route to the WA2 office, while the group of trunk lines 210, etc., comprises a second choice route to the WA2 office via the SP9 office in tandem relation.

Referring now to Fig. 2, in the RA6 office, two of the subscriber substations T1 and T2 are illustrated as being connected to the subscriber lines having the respective directory numbers: 7930 and 7981. Each of the subscriber lines is provided with a line circuit individual thereto, the line circuits 300 and 400 being individual to the respective subscriber lines 7930 and 7981. Moreover, the subscriber lines 7930, etc., are of first and second classes depending upon whether or not the subscriber lines are entitled to access to the toll recording equipment and consequently to automatic suburban toll call service. Specifically, any subscriber line may be readily converted between the first and second classes by the manipulation of a plug with respect to an associated jack in the terminating line circuit, as explained more fully hereinafter. Also the RA6 office comprises a local switch train, including a plurality of finder-first selector groups respectively associated with the individual hundred line groups of subscriber lines. The group of finder-first selectors associated with the 7900 group of subscriber lines includes the finder-first selector, consisting of the finder 360 and the first selector 410. Accordingly, the finder 360 has access to the 7900 group of subscriber lines, including the subscriber lines 7930 and 7981 illustrated. Also this group of finder-first selectors is provided with an associated distributor 341 that is operatively associated with the line circuits 400, 300, etc., of the subscriber lines in the 7900 group.

Further, the local switch train comprises appropriate groups of second selectors there being illustrated, the sixth group of second selectors, including the second selector 411 that is accessible via the associated trunk 412 to the first selectors 410, etc., and the seventh group of second selectors, including the second selector 413 that is accessible via the associated trunk 414 to the first selectors 410, etc. Also the local switch train comprises appropriate groups of third selectors, there being illustrated, the second group of third selectors including the third selector 415 that is accessible via the associated trunk 416 to the second selectors in the seventh group 413, etc. Also the local switch train comprises appropriate groups of fourth selectors, there being illustrated the sixth group of fourth selectors including the fourth selector 417 that is accessible via the associated trunk 418 to the third selectors in the second group 415, etc. Also the local switch train comprises appropriate groups of fifth selectors, there being illustrated the seventh group of fifth selectors including the fifth selector 419 that is accessible via the associated trunk 420 to the fourth selectors 417, etc. Finally, the local switch train comprises appropriate groups of connectors, there being illustrated the ninth group of connectors including the connector 421 that is accessible via the associated trunk 422 to the fifth selectors 419, etc. The connectors 421, etc., in turn, have access to the 7900 group of subscriber lines including the subscriber lines 7930 and 7981, respectively extending to the subscriber substations T1 and T2.

Also in the RA6 office, there are provided an appropriate group of toll recording links of the one-digit recapture type 500, etc., that are accessible via associated trunks 510, etc., to the various first selectors 410, etc.; an appropriate group of toll recording links of the two-digit recapture type 1100, etc., that are accessible via associated trunks 1110, etc., to the various second selectors 411, 413, etc.; and an appropriate group of toll recording links of the three-digit recapture type 1200, etc., that are accessible via associated trunks 1210, etc., to the various third selectors 415, etc. Specifically, in the example illustrated, the trunk 510 extending to the toll recording link 500 is accessible in the third, fifth and ninth levels of the first selectors 410, etc.; the trunk 1110 extending to the toll recording link 1100 is accessible in the second and sixth levels of the second selectors 411, etc., and in the seventh levels of the second selectors 413, etc.; and the trunk 1210 extending to the toll recording link 1200 is accessible in the first, third and seventh levels of the third selectors 415, etc. Each of the toll recording links 500, 1100, 1200, etc., terminates in an automatic switch individual thereto; and an allotter 520 is provided that is commonly associated with the toll recording links 500, etc., and has access thereto, for a purpose more fully explained hereinafter. Further, a marking cable 370 is provided that is commonly associated with each of the line circuits 400, 300, etc., and with each of the toll recording links 500, 1100, 1200, etc., that is employed in an identifying arrangement, described more fully subsequently. Further, there is provided a manual and intercept operator position 423 that is accessible via a group of trunks 424, etc., to the various selectors in the local switch train. As illustrated, the trunk 424 is accessible in the first, second, fourth, eighth and tenth levels of the first selectors 410, etc., and accessible in the first, third, fourth, fifth, sixth, eighth, ninth and tenth levels of the second selectors 413, etc., and accessible in the second, fourth, fifth, eighth, ninth and tenth levels of the third selectors 415, etc., and accessible in certain levels, not shown, of the second selectors 411, etc. As shown in Fig. 2 in the RA6 office, the trunk lines 210, 220, 230, 240, etc., terminate in trunk circuits 211, 221, 231, 241, etc., individual thereto, that are provided with individual incoming trunks 213, 223, 233, 243, etc., as well as individual outgoing trunks 212, 222, 232, 242, etc., terminating in individual line switches 214, 224, 234, 244, etc. A group of incoming links 250, etc., is provided that is accessible to the various line switches 214, 224, 234, 244, etc. Each of the incoming links 250, etc., is provided with an associated terminating trunk selector 251, etc., and an individual finder 252, etc. The trunk selectors 251, etc. terminating the incoming links 250, etc., have access to the various incoming trunks 213, 223, 233, 234, etc., extending to the trunk circuits 211, 221, 231, 241, etc., terminating the trunk lines 210, 220, 230, 240, etc. Moreover, the trunks 213, 223, 233, 243, etc., are also accessible to the automatic switches respectively terminating the toll recording links 500, 1100, 1200, etc. Further, the finders 252, etc., individual to the incoming links 250, etc., have access to a group of register translators 253, etc. Finally, the switch train in the RA6 office comprises a group of office selectors 201, etc., that are accessible via individual trunks 202, etc., to the trunk selectors 251, etc.; the office selectors 201, etc., having access to the various groups of fourth selectors 417, etc., via the associated trunks 418, etc. As illustrated, the trunk selectors 251, etc. and the various automatic switches respectively terminating the toll recording links 500, 1100, 1200, etc., have access to the trunks 243, 233, 223 and 213 in the respective second, fourth, sixth and eighth levels thereof; and the trunk selectors 251, etc., have access to the trunks 202, etc., in the tenth levels thereof. Finally, it is noted that each of the toll recording links 500, 1100, 1200, etc., comprises toll recording equipment individually incorporated therein and essentially including a magnetic recorder, as explained more fully hereinafter.

In view of the foregoing, it will be understood that each of the other offices RA3, etc., is provided with apparatus substantially identical to that described above in conjunction with the RA6 office.

*Section 2.—The apparatus incorporated in the telephone system*

In the RA6 office, each of the subscriber substations T1, etc., is provided with conventional subscriber substation apparatus, including a telephone instrument, a dial mechanism, and a ringer. Preferably the finders 360, etc., the various selectors 201, 410, 411, 413, 415, 417, 419, etc., and the connectors 421, etc., are of conventional Strowger types.

The line circuits 300, 400, etc., may be substantially identical; and the line circuit 300, illustrated in Fig. 3, comprises a relay group, including a cutoff relay R310, a line relay R320, and a lockout relay R330. Also the line circuit 300 comprises a lockout tone transformer 342 and a jack 355 that is adapted to receive an associated plug 356 terminating a gaseous discharge tube 357; the lockout tone transformer 342 and the gaseous discharge tube 357 comprising a portion of an arrangement that is employed for the purpose of converting the subscriber line 7930 terminated by the line circuit 300 between the first and second classes, previously mentioned. More specifically, the subscriber line 7930 may be converted from the first class that is entitled to automatic suburban toll dialing service to the second class that is denied this service merely by inserting the plug 356 into the jack 355, as explained more fully hereinafter. Also the line circuit 300 is provided with four groups of gaseous discharge tubes 371, etc., 372, etc., 373, etc., and 375, etc., that are commonly connected to the control conductor 353 of the subscriber line 7930 extending to the associated finders 360, etc. The marking cable 370 comprises four groups of marking conductors T370, H370, D370 and U370 respectively corresponding to the thousand, the hundred, the ten and the unit digits of the directory number of the various subscriber lines 7930, etc. Each of the groups of marking conductors T370, etc., includes four individual marking conductors respectively constituting the W, X, Y and Z marking conductors of a WXYZ code marking system. Accordingly, in the line circuit 300, the one or more gaseous discharge tubes 371, etc., are connected to the individual marking conductors in the group T370, in accordance with the thousand digit of the directory number of the subscriber line 7930, which arrangement requires only one tube 371 connected to the W conductor in the group T370 in accordance with the digit 7 in the usual WXYZ code marking system. Similarly, the one or more gaseous discharge tubes 372, etc., are connected to the individual marking conductors in the group H370 in accordance with the hundred digit of the directory number of the subscriber line 7930, which arrangement requires only one tube 372 connected to the Y conductor in the group H370 in accordance with the digit 9 in the usual WXYZ code marking system. Similarly the one or more gaseous discharge tubes 373, etc., are connected to the individual marking conductors in the group D370 in accordance with the ten digit of the directory number of the subscriber line 7930, which arrangement requires two tubes 373 and 374, respectively connected to the W and Z conductors in the group D370 in accordance with the digit 3 in the usual WXYZ code marking system. Finally, the one or more gaseous discharge tubes 375, etc., are connected to the individual marking conductors in the group U370 in accordance with the unit digit of the directory number of the subscriber line 7930, which arrangement requires only one tube 375 connected to the Z conductor in the group U370 in accordance with the digit 0 in the usual WXYZ code marking system. Preferably the various tubes 371, etc., are removably received in associated jacks or fixtures commonly terminating conductor 353 and respectively terminating the various marking conductors in the groups T370, etc., so that the various tubes 371, etc., may be readily changed with respect to the associated jacks or fixtures in the event of a change in the directory number of the subscriber line terminated by the associated line circuit 300, etc.

In view of the above, it will be understood that while the line circuit 400 is substantially identical to the line circuit 300, the various tubes incorporated therein are plugged into the associated fixtures or jacks in accordance with the directory number 7981, which it may be assumed has been assigned to the terminated subscriber line 7981.

The arrangement of the line circuits 300 and 400 in order to obtain identification of the directory numbers of the calling subscriber lines incident to the extension of suburban toll calls therefrom and to obtain class control with respect to the extension of such suburban toll calls from the calling subscriber lines, is disclosed in the copending divisional application of Douglas O. Baird and Raymond G. Bielenberg, Serial No. 498,803, filed April 4, 1955.

Also in the RA6 office, the distributors 341, etc., and the operator position 423 may be of conventional types; while the trunk circuits 211, etc., the incoming links 250, etc., the trunk selectors 251, etc., and the register translators 253, etc., may be of any suitable type, and are preferably of the character of the corresponding pieces of apparatus disclosed in the copending application of Douglas O. Baird and Raymond G. Bielenberg, Serial No. 231,728; in which a trunk circuit (corresponding to the trunk circuit 211) is illustrated at 300 in Fig. 3 thereof; an incoming link (corresponding to the incoming link 250) is illustrated at 400 in Fig. 4 thereof; a trunk selector (corresponding to the trunk selector 251) is illustrated at 450 in Fig. 4 thereof; and a register translator (corresponding to the register translator 253) is illustrated at 900 in Figs. 9 and 10 thereof.

The toll recording links of the one-digit recapture type 500, etc., may be identical; and the link 500 illustrated in Figs. 5 to 10, inclusive, comprises a relay group including a line relay R530, a hold relay R540, a switch relay R550, a register relay R560, an identity relay R570, a record relay R580, a line relay R590, a hold relay R610, an answer relay R620, a shunt relay R630, a series relay R635, a step relay R640, a switchthrough relay R650, a gang relay R710, a pickup relay R720, a start relay R730, a series relay R810, a step relay R815, a lockout relay R820, a plurality of recapture relays, three of which are illustrated at R830, R835 and R840, two route relays R850 and R860, a busy relay R910, a shunt relay R920, a stop-send relay R930, a release relay R1015, and a gang relay R1030. In passing, it is noted that the recapture relays R830, R835 and R840 respectively correspond to the recaptured digits 3, 5 and 9 and are respectively operated when the incoming trunk 510 extending to the toll recording link 500 is selected in the respective third, fifth and ninth levels of the first selectors 410, etc.

Also the toll recording link 500 comprises four groups of WXYZ storage relays 1001, 1002, 1003 and 1004 that are employed for the purpose of storing the respective thousand, hundred, ten and unit digits of the directory number of a calling subscriber line connected thereto, as well as six storage switches or registers O2, O3, N1, N2, N3 and N4 that are employed for the purpose of storing the respective second office code digit, and third office code digit of a three-digit called office code, and the thousand digit, hundred digit, ten digit and unit digit of a four-digit directory number of a called subscriber line involved in a connection routed via the toll recording link 500. Further, the toll recording link 500 comprises a register sequence switch 1RS, a send sequence switch 1SS, a digit send switch DS, a record sequence switch RSS, a ten minute timer switch TT, and a unit minute timer switch UT, as well as a source of booster battery 516, two constantly rotating sending cams 926 and 1045 and a constantly rotating timing cam 712. The booster battery 516 that is provided may be of +70 volts with respect to −48 volts exchange battery and is provided with a grounded negative terminal and an ungrounded positive terminal; the impulsing cam 926 may have a speed of rotation of about ten revolutions per second, the impulsing cam 1045 may have a speed of rotation of about twenty revolutions per second, and the timing cam 712 has a speed of rotation of one revolution per minute.

Operation of the recapture relay R830 effects the recapture of the first called office code digit 3, and registers the first office code digit 3, at the contacts 834, upon the third marking conductor M3 of the group of marking conductors 890; and upon operating, the recapture relays R835 and 840 effect corresponding functions with respect to the first called office code digits 5 and 9. Also upon operating, the recapture relay R830 effects the registration, at the contacts 833, first and second choice routes between the RA6 office and the next office to which the connection should be extended based upon the first called office code digit 3 and dependent upon the positions of the route relays R850 and R860, as explained more fully hereinafter; and upon operating, the recapture relays 835 and R840 effect corresponding functions with respect to the first called office code digits 5 and 9.

The office register O2 is of the minor type including a wiper O21 provided with an associated contact bank, a rotary magnet O22 for driving the wiper noted step by step in the clockwise direction away from its home position, a release magnet O23 for releasing the wiper noted and for causing it to be returned back into its home position, and a set of switch springs O24 that is operated when the wiper noted is driven out of its home position. The office code register O3 and the numerical registers N1, N2, N3 and N4 are identical to the office code register O2 and respectively comprise the wipers O31, N11, N21, N31 and N41, the operate magnets O32, N12, N22, N32 and N42, the release magnets O33, N13, N23, N33 and N43, and the sets of switch springs O34, N14, N24, N34 and N44. The register sequence switch 1RS is of the minor type including a wiper 1RS1, provided with an associated contact bank, a rotary magnet 1RS2 for driving the wiper noted step by step in the clockwise direction away from its home position, a release magnet 1RS3 for releasing the wiper noted and for causing it to be returned back into its home position, and a set of switch springs 1RS4 that is operated when the wiper noted is driven out of its home position. The send sequence switch 1SS is of the rotary type including two wipers 1SS1 and 1SS2 provided with individually associated contact banks, a rotary magnet 1SS3 for driving the wipers step by step in the clockwise direction, and a set of switch springs 1SS5 that is operated when the wipers noted are driven out of their home positions. The digit send switch DS is of the rotary type including two wipers DS1 and DS2 provided with individually associated contact banks, and a rotary magnet DS3 for driving the wipers noted step by step in the clockwise direction away from their home positions. The ten minute timer TT is of the minor type including a wiper TT1 provided with an associated contact bank, a rotary magnet TT2 for driving the wiper noted step by step in the clockwise direction away from its home position, a release magnet TT3 for releasing the wiper noted and for causing it to be returned back into its home position, and a set of switch springs TT4 that is operated when the wiper noted is driven out of its home position. The unit minute timer UT is of the rotary type, including two wipers UT1 and UT2 provided with individually associated contact banks, and a rotary magnet UT3 for driving the wipers noted step by step in the clockwise direction. Finally, the record sequence switch RSS is of the minor type including a wiper RSS1 provided with an associated contact bank, a rotary magnet RSS2 for driving the wiper noted step by step in the clockwise direction away from its home position, a release magnet RSS3 for releasing the wiper noted and for causing it to be returned back into its home position, and a set of switch springs RSS4 that is operated when the wiper noted is driven out of its home position.

Further, the toll recording link 500 comprises a repeater 625 including coupled windings 626, 628 and 627, 629, and is terminated by a switching mechanism 660 of the Strowger type. The mechanism 660 includes a wiper shaft carrying three wipers 661, 662, and 663, a vertical magnet M664 for driving the wiper shaft step by step in the vertical direction away from its normal vertical position, a rotary magnet M665 for driving the wiper shaft step by step in the rotary direction away from its normal rotary position, and a release magnet M667 for releasing the wiper shaft and for causing it to be returned back into its normal rotary and vertical positions. Also associated with the Strowger mechanism 660 are two sets of switch springs S632 and S633 that are operated when the wiper shaft is driven one step in the vertical direction out of its normal vertical position, as well as a set of switch springs S517 that is operated when the wiper shaft is driven eleven steps in the rotary direction away from its normal rotary position. Finally, the toll recording link 500 comprises a magnetic recorder 700 individual thereto and including a magnetic recording head 706 carrying an associated winding 708 and operatively associated with an elongated paramagnetic medium 701 carried by two reels 702 and 703. In the arrangement, the medium 701 is wound from the reel 702 onto the reel 703 by a drive connection between a motor 704 and the reel 703, the drive connection including a suitable power transmission 705. In the arrangement the elongated medium 701 may consist of a wire or tape formed directly of paramagnetic material or it may consist of a wire or tape formed of paper or other nonmagnetic material and coated with a paramagnetic material.

The toll recording links of the two-digit recapture type 1100 may be identical; and the link 1100, a fragmentary portion of which is illustrated in Fig. 11, comprises an incoming trunk 1110 and a relay group including a plurality of recapture relays, three of the recapture relays being illustrated at R1130, R1135, and R1140, a lockout relay R1120, two route relays R1150 and R1160, etc. In the arrangement, the recapture relays R1130, R1135 and R1140 respectively correspond to the first and second called office code digit combinations 6–2 and 6–6 and 7–7. Thus the recapture relay R1130 is operated to recapture the combination of the first and second called office code digit 6 and 2 and is operated in response to seizure of the incoming trunk 1110 in the second level of the second selectors 411, etc. Upon operating, the recapture relay R1130 registers, at the contacts 1131, the first called office code digit 6 upon the associated group of marking conductors; registers, at the contacts 1132, the second called office code digit 2 upon the associated group of marking conductors; and registers, at the contacts 1133, first and second choice routes between the RA6 office and the next office to which the connection should be extended based upon the combination of the first and second called office code digits 6 and 2 and dependent upon the positions of the route relays R1150 and R1160, as explained more fully hereinafter. The respective functions of the recapture relays R1135 and R1140 in order to bring about the recapture of the combinations of first and second called office code digits 6–6 and 7–7 are the same as that of the recapture relay R1130, described above. Further, the toll recording link 1100 comprises the register sequence switch 2RS, the send sequence switch 2SS, etc., as well as a third called office code digit register and four numerical called line digit registers. Thus the toll recording link 1100 of the two-digit recapture type is somewhat more simplified than the toll recording link 500 of the one-digit recapture type in view of the fact that only one called office code register is required therein, since the first two of the three called office code digits are recaptured by the recapture relays R1130, etc.

The toll recording links of the three-digit recapture type 1200, etc., may be identical; and the link 1200, a fragmentary portion of which is illustrated in Fig. 12, comprises an incoming trunk 1210 and a relay group, including a plurality of recapture relays, three of the recapture relays being illustrated at R1230, R1235 and R1240, a lockout relay R1220, two route relays R1250 and R1260, etc. In the arrangement, the recapture relays R1230, R1235 and R1240 respectively correspond to the first and second and third called office code digit combinations: 7–2–1 and 7–2–3 and 7–2–7. Thus the recapture relay R1230 is operated to recapture the combination of the first and second and third called office code digits 7 and 2 and 1 and is operated in response to seizure of the incoming trunk 1210 in the first level of the third selectors 415, etc. Upon operating, the recapture relay R1230 registers, at the contacts 1231, the first called office code digit 7 upon the associated group of marking conductors; registers, at the contacts 1232, the second called office code digit 2 upon the associated group of marking conductors; registers, at the contacts 1233, the third called office code digit 1 upon the associated group of marking conductors; and registers, at the contacts 1234, first and second choice routes between the RA6 office and the next office to which the connection should be extended, based upon the combination of the first and second and third called office code digits 7–2–1 and dependent upon the positions of the route relays R1250 and R1260, as explained more fully hereinafter. The respective functions of the recapture relays R1235 and R1240 in order to bring about the recapture of the combinations of the first and second and third called office code digits 7–2–3 and 7–2–7 are the same as that of the recapture relay R1230, described above. Further, the toll recording link 1200 comprises the register sequence switch 3RS, the send sequence switch 3SS, etc., as well as four numerical called line digit registers. Thus the toll recording link 1200 of the three-digit recapture type is somewhat more simplified than the toll recording link 1100 of the two-digit recapture type, in view of the fact that no called office code register is required therein, since all of the three called office code digits are recaptured by the recapture relays R1230, etc.

Figure 5:
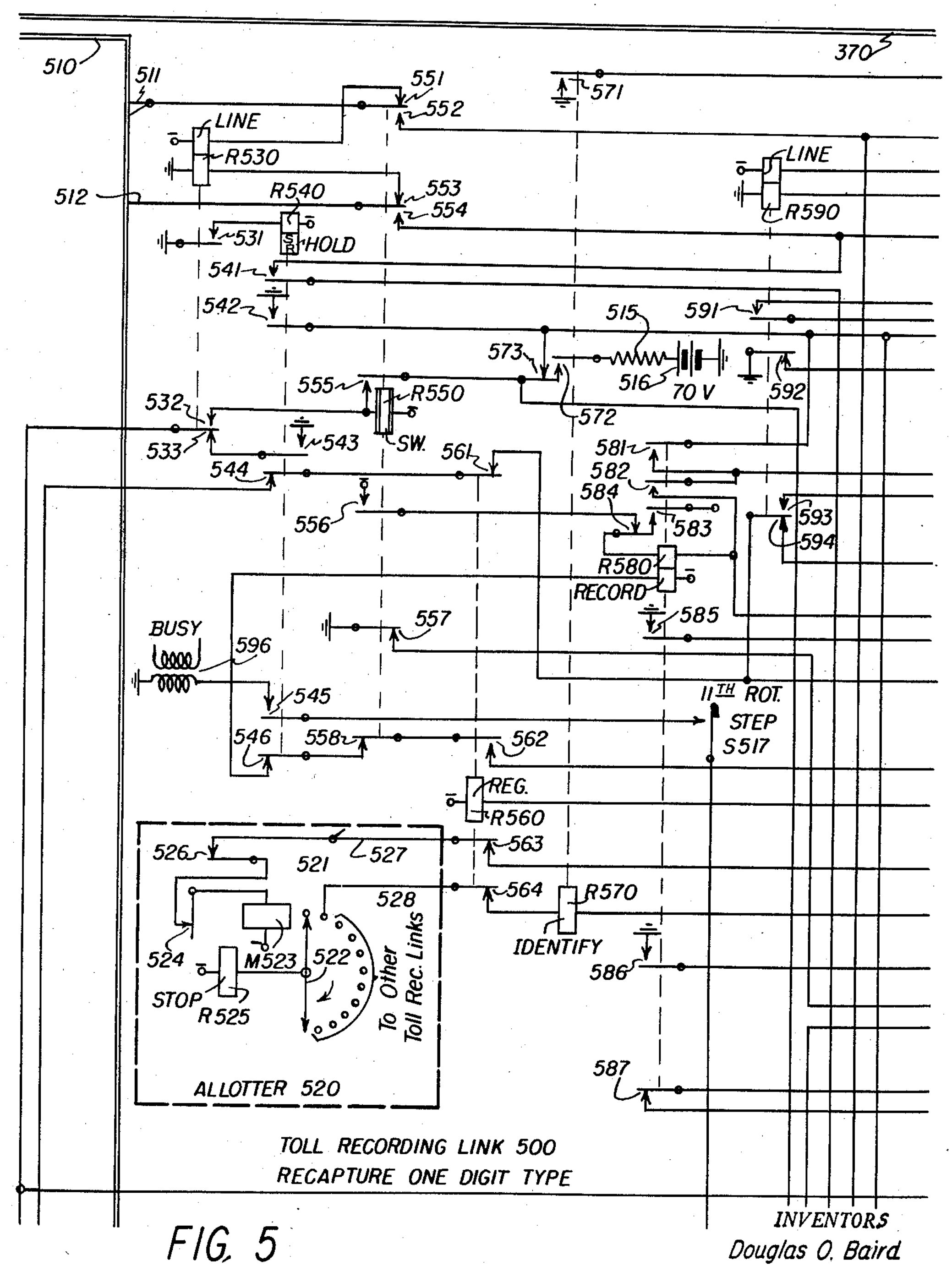
Figure 6:
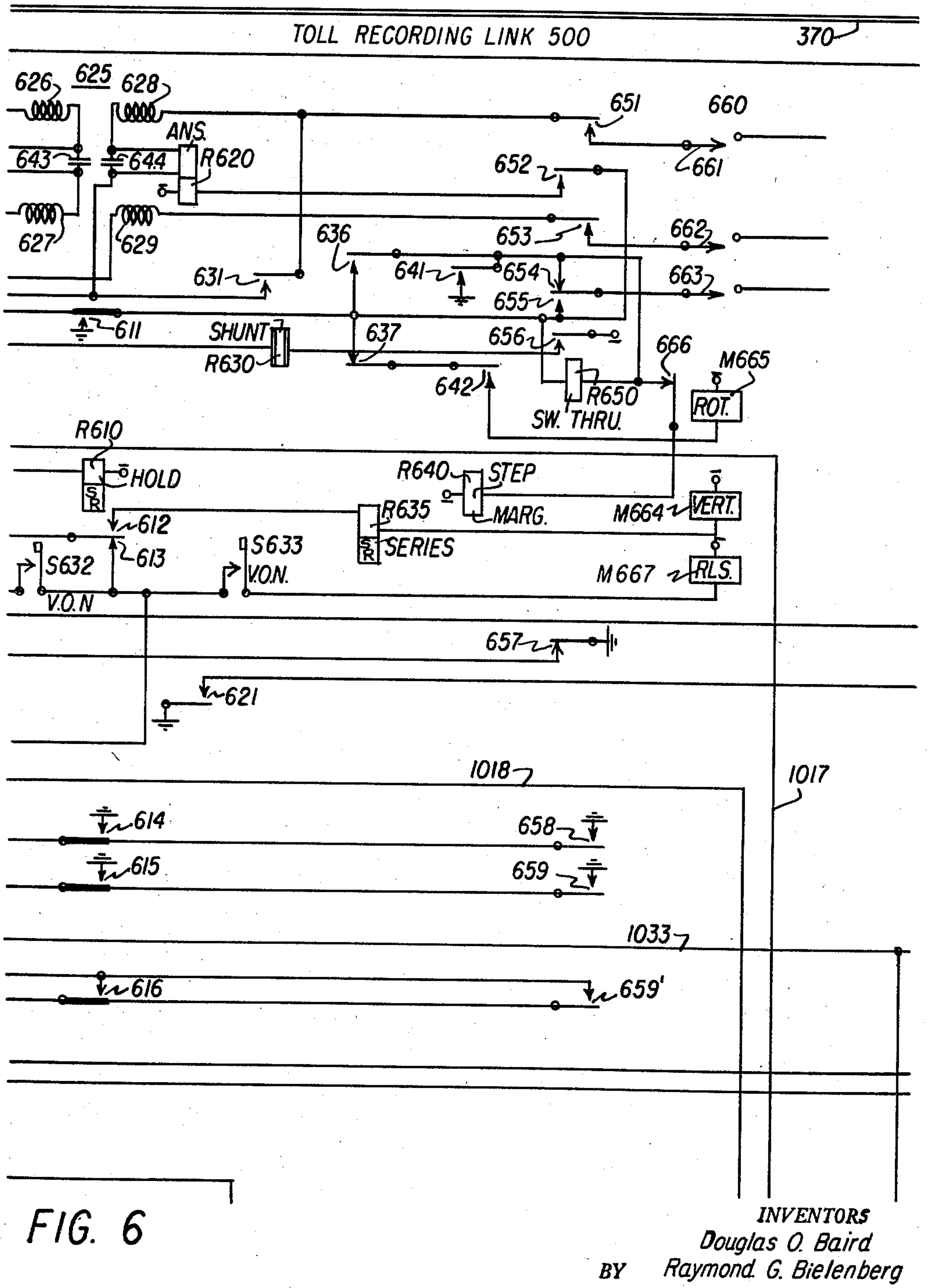
Figure 7:
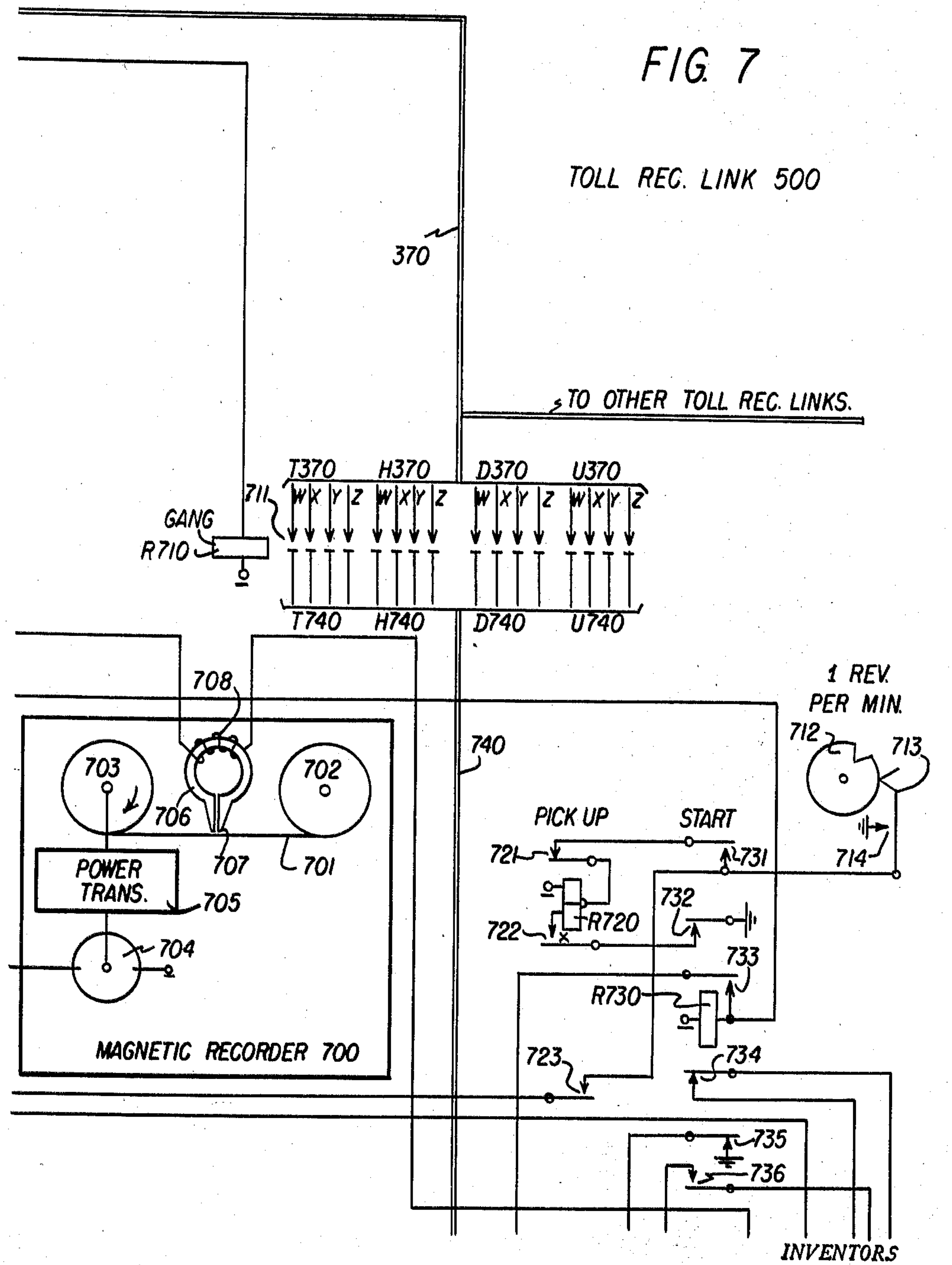
Figure 8:
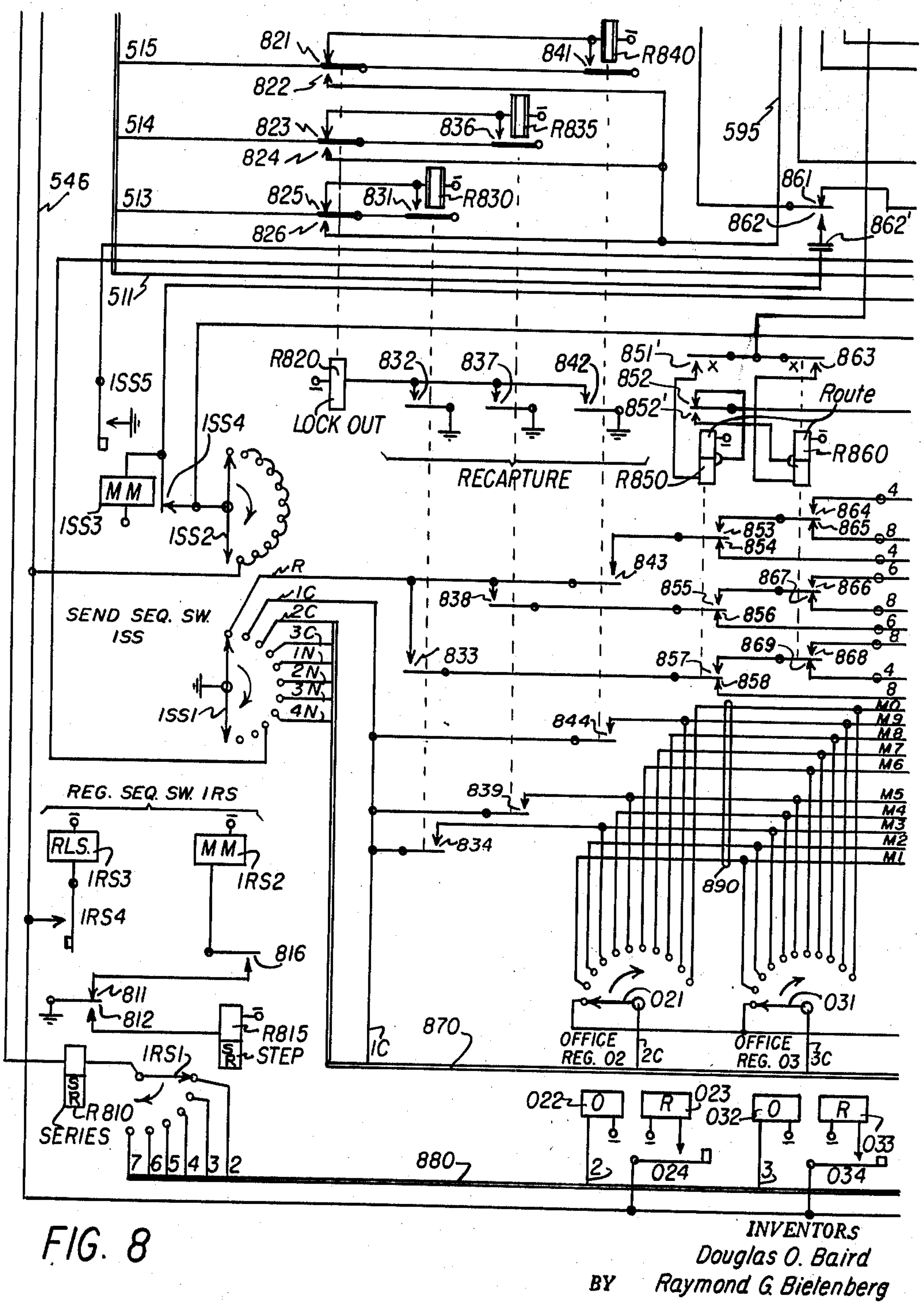
Figure 9:
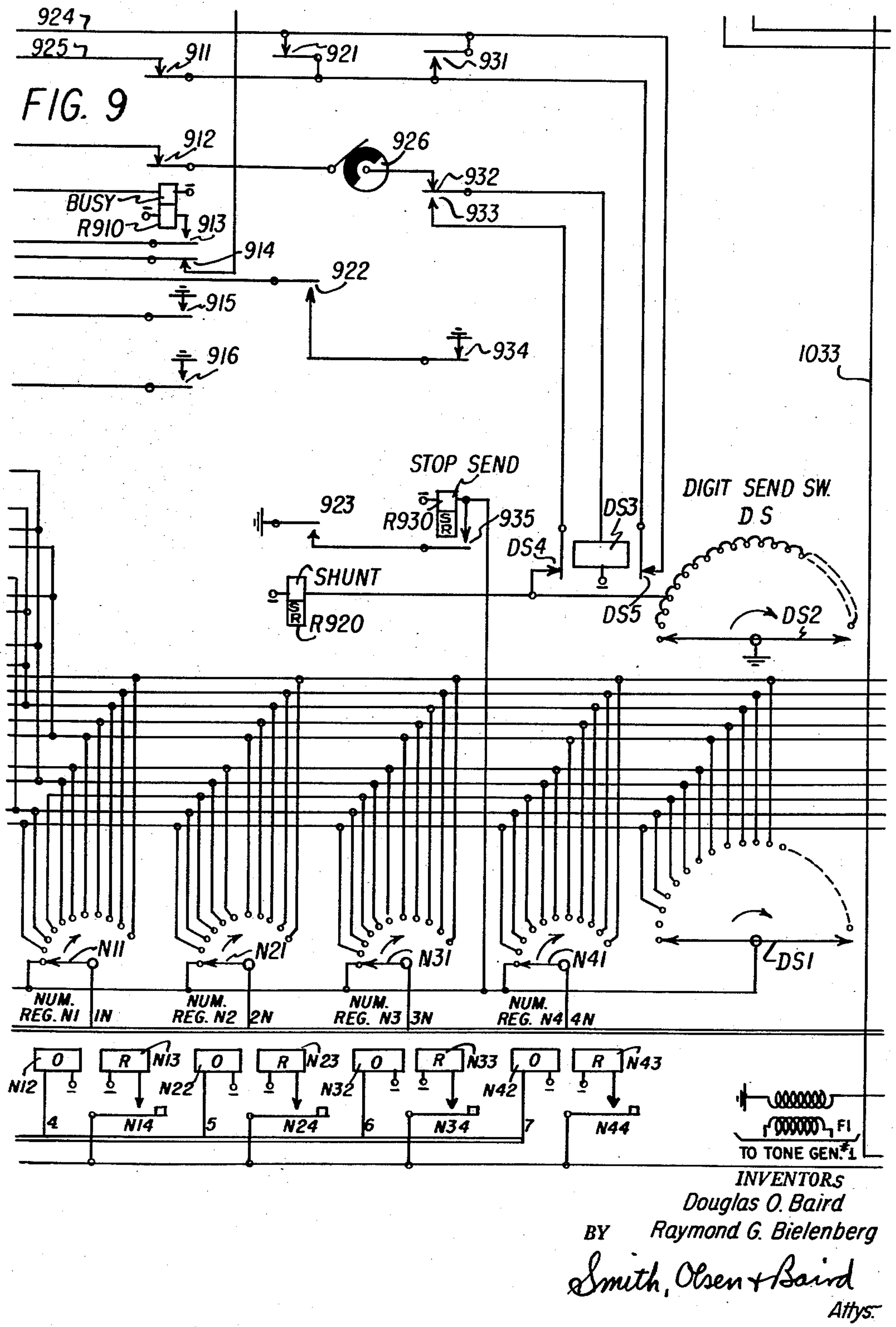
Figure 10:
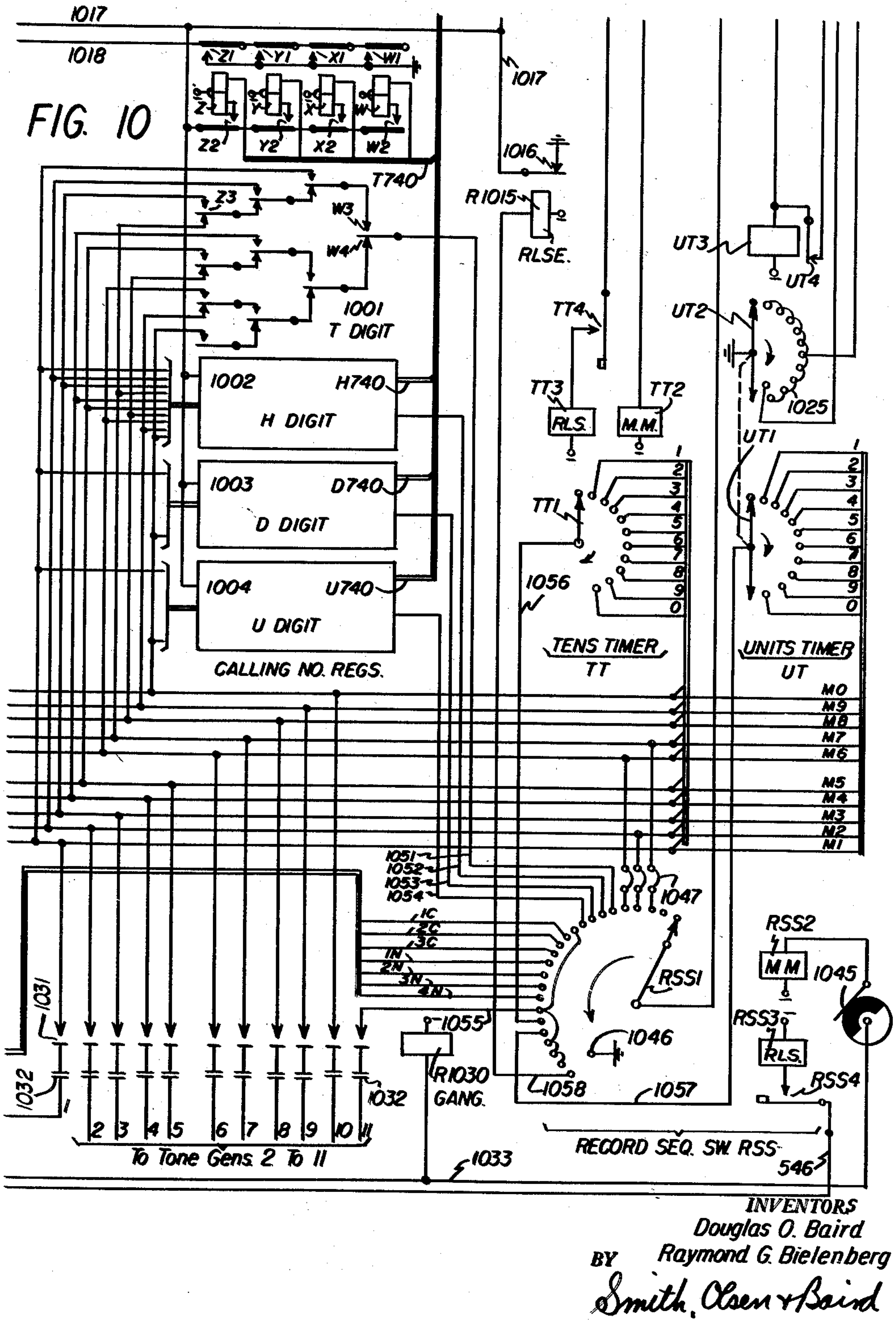

The allotter 520 that is commonly associated with the toll recording links 500, 1100, 1200, etc., comprises, as illustrated in Fig. 5, a stop relay R525, a common start conductor 527, individual conductors 528, etc., extending to the respective links 500, etc., and a rotary switch 521, including a wiper 522 provided with an associated contact bank terminating the conductors 528, etc., as well as a rotary magnet M523 for driving the wiper noted step by step in the clockwise direction.

The connection and arrangement of the apparatus incorporated in the telephone system will best be understood from the following description of the setting-up of various telephone connections therein.

*Section 3.—Local calls in the RA6 office*

Considering now the extension of a local call from a calling subscriber substation to a called subscriber substation in the RA6 office, such, for example, as a call from the calling subscriber substation T1 to the called subscriber substation T2, the subscriber at the calling subscriber substation T1 initiates the call and then dials the called office code RA6 (726) followed by the numerical designation 7981 of the subscriber line extending to the called subscriber substation T2. When the call is initiated at the calling subscriber substation T1, a loop circuit, including the line conductors 351 and 352 of the subscriber line 7930, as well as the contacts 311, 312 and 333, is completed for energizing in series the upper and lower windings of the line relay R320 in the line circuit 300 individual to the calling subscriber line 7930, whereby the line relay R320 operates. Upon operating the line relay R320 interrupts, at the contacts 324, the normal connection from battery potential via the winding of the cutoff relay R310 to the control conductor 354 of the subscriber line 7930; and completes, at the contacts 323, a path for applying direct ground potential to the control conductor 354; whereby the subscriber line 7930 is marked as busy to the connectors in the local switch train having access thereto. Also the line relay R320 completes, at the contacts 321, a connection from battery potential via the winding of the cutoff relay R310 to the control conductor 353 of the subscriber line 7930 appearing before the finders 360, etc. Finally, the line relay R320 completes, at the contacts 322, a path, including the contacts 338, for applying ground potential to the start conductor 340 extending to the distributor 341 that is associated with the group of finders 360, etc.

More particularly, the distributor 341 is governed to effect the assignment of an idle one of the finder-selector links, such, for example, as the link illustrated consisting of the finder 360 and the first selector 410; whereby the finder 360 is operated to find the calling subscriber line 7930; whereby ground potential in the first selector 410 is applied to the control conductor 353 of the subscriber line 7930 completing a circuit substantially identical to that previously traced for energizing the winding of the cutoff relay R310 so as to cause the latter relay to operate. Upon operating the cutoff relay R310 completes, at the contacts 314, a substantially identical holding circuit for energizing the winding thereof; interrupts, at the contacts 311 and 312, the connection between the upper and lower windings of the line relay R320 and the line conductors 351 and 352 of the calling subscriber line 7930; and prepares, at the contacts 313, a test connection for energizing the upper winding of the lockout relay R330. The last-mentioned test connection includes the jack 355 and the plug 356 terminating the gaseous discharge tube 357 and is employed only in the event that the calling subscriber line 7930 is of the second-class; and for the present purpose, it may be assumed that the calling subscriber line 7930 is of the first-class, whereby the plug 356 is disconnected from the jack 355. At this time the loop circuit from the calling subscriber line 7930 is extended via the contacts 331 and 332 and the operated finder 360 to the line relay in the first selector 410, whereby dial tone is returned over the connection to the calling subscriber substation T1.

The first selector 410 responds to the first office code digit 7 to select the corresponding group of second selectors and then to select an idle second selector in the selected group; for example, the first selector 410 may select the trunk 414 extending to the second selector 413. The second selector 413 responds to the second office code digit 2 to select the corresponding group of third selectors and then to select an idle third selector in the selected group; for example, the second selector 413 may select the trunk 416 extending to the third selector 415. The third selector 415 responds to the third office code digit 6 to select the corresponding group of fourth selectors and then to select an idle fourth selector in the selected group; for example, the third selector 415 may select the trunk 418 extending to the fourth selector 417. The fourth selector 417 responds to the first numerical digit 7 to select the corresponding group of fifth selectors and then to select an idle fifth selector in the selected group; for example, the fourth selector 417 may select the trunk 420 extending to the fifth selector 419. The fifth selector responds to the second numerical digit 9 to select the corresponding group of connectors and then to select an idle connector in the selected group; for example, the fifth selector 419 may select the trunk 422 extending to the connector 421. The connector 421 responds to the third numerical digit 8 and to the fourth numerical digit 1 to select the subscriber line 7981 extending to the called subscriber substation T2.

The subsequent operation of the connector 421 depends upon the idle or busy condition of the called subscriber substation T2 at this time. First assuming that the called subscriber substation T2 is busy, the connector 421 operates the return busy tone over the connection back to the calling subscriber substation T1, whereby the subscriber thereat releases the connection in a conventional manner. Now assuming that the called subscriber substation T2 is idle, the connector 421 operates to project ringing current over the called subscriber line 7981 and to return ring-back tone over the connection to the calling subscriber substation T1. Subsequently, when the subscriber at the called subscriber substation T2 answers the call, the connector 421 operates to interrupt the projection of ringing current over the subscriber line 7981, to interrupt the return of ring-back tone over the connection to the calling subscriber substation T1, and to reverse the polarity of battery over the connection between the connector 421 and the calling subscriber substation T1; which reversal of battery potential over the connection noted may be employed in the line circuit 300 individual to the calling subscriber line 7930, for metering purposes, in a conventional manner, not shown. At the conclusion of the established connection, the subscribers at the calling and called subscriber substations T1 and T2 disconnect, whereby all of the apparatus involved in the established connection is released and rendered available for further use.

In view of the foregoing description of the mode of establishing a local connection between a calling subscriber substation and a called subscriber substation in the RA6 office, it will be understood that in a substantially identical manner local connections may be completed between calling and called subscriber substations in the other offices RA3, WA2, etc.

*Section 4.— Operator and intercepted calls in the RA6 office*

In order to complete a connection from a calling subscriber substation in the RA6 office to the manual and intercept operator position 423 therein, the subscriber at the calling subscriber substation, such, for example, as the subscriber substation T1 initiates the call and then dials the single digit 0. Also it will be observed that the other single digits 1, 2, 4 and 8 bring about the interception of the call at the manual and intercept operator position 423. Furthermore the two-digit combinations 71, 73, 74, 75, 76, 78, 79 and 70 bring about the interception of the call at the local and interceptor operator position 423. Finally, the three-digit combinations 722, 724, 725, 728, 729 and 720 bring about the interception of the call at the manual and intercept operator position 423. This interception of the calls noted above takes place by virtue of the circumstance that the trunks 424, etc., extending to the position 423 commonly terminate in the first, second, fourth, eighth and tenth levels of the first selectors 410, etc., commonly terminate in the first, third, fourth, fifth, sixth, eighth, ninth and tenth levels of the second selectors 413, etc., and commonly terminate in the second, fourth, fifth, eighth, ninth and tenth levels of the third selectors 415, etc. The answering of a call at the position 423 is entirely conventional and the subsequent release of the established connection thereto from the calling subscriber substation T1 takes place when the calling subscriber substation T1 disconnects.

In view of the foregoing description of operator and intercepted calls in the RA6 office, it will be understood that similar calls in the other offices RA3, WA2, etc., may be completed in an analogous manner.

*Section 5.—A call from a first class subscriber substation in the RA6 office to a subscriber substation in the WA2 office*

Considering the extension of a call from a first class subscriber substation in the RA6 office to a subscriber substation in the WA2 office, such, for example, as a call from the calling subscriber substation T1 in the RA6 office to the subscriber substation terminated by the subscriber line 1234 in the WA2 office, it is again noted that the subscriber line 7930 extending to the calling subscriber substation T1 is rendered of the first class by the removal of the plug 356 terminating the gaseous discharge tube 357 from the associated jack 355 in the line circuit 300 individual to the subscriber line 7930. The subscriber at the calling subscriber substation T1 initiates the call and then dials the called office code WA2 (922) followed by the numerical designation 1234 of the called subscriber line. When the call is initiated at the calling subscriber substation T1, the finder-first selector link illustrated may be employed; whereby the finder 360 finds the calling subscriber line 7930 and the first selector 410 responds to the first office code digit 9. More particularly, the first selector 410 selects the corresponding group of trunks, including the trunk 510, and then an idle trunk in the selected group. Specifically the first selector 410 may select the trunk 510 extending to the toll recording link of the one-digit recapture type 500, the trunk 510 being marked as idle in the ninth level of the first selector 410 by the presence of battery potential upon the control conductor 515 thereof. Specifically battery potential is applied via the winding of the recapture relay R840 in the link 500 and the contacts 821 to the control conductor 515 of the trunk 510. When the first selector 410 seizes the trunk 510, it applies ground potential therein to the control conductor 515 thereof, whereby the winding of the recapture relay R840 is energized over the above traced circuit causing the latter relay to operate. Upon operating, the recapture relay R840 completes, at the contacts 841, a multiple holding circuit for energizing the winding thereof via the grounded control conductor 515 of the trunk 510; and completes, at the contacts 842, a circuit for operating the lockout relay R820. Upon operating, the lockout relay R820 interrupts, at the contacts 821, 823 and 824, the initial paths for applying battery potential via the windings of the respective recapture relays R840, R835 and R830 to the respective control conductors 515, 514 and 513 of the trunk 510; and completes, at the contacts 822, 824 and 826, multiple connections between the control conductors 515, 514 and 513 so that ground potential upon the control conductor 515 is applied to the control conductors 514 and 513 so as to mark the trunk 510 as busy, in the respective ninth, fifth and third levels of all of the other first selectors having access thereto. Also the first selector 410 switches through completing a loop circuit between the calling subscriber substation T1 and the upper and lower windings of the line relay R530 in the link 500, the circuit mentioned including the contacts 551 and 553, as well as the line conductors 511 and 512 of the trunk 510. Accordingly, the line relay R530 operates to complete, at the contacts 531, a circuit for operating the hold relay R540. Also the hold relay R540 completes, at the contacts 542, a multiple path, including the contacts 573, for applying ground potential to the conductor 595 extending to the contacts 822, 824 and 826, so as positively to insure the application of ground potential to the control conductors 515, 514 and 513 of the trunk 510.

Further, the operated recapture relay R840 completes, at the contacts 844, a connection between the first code conductor 1C and the ninth marking conductor M9 in the group of marking conductors 890 for the purpose of registering the recaptured first office code digit 9 in the link 500. Further, the operated recapture relay R840 completes, at the contacts 843, a connection between the route conductor R and the contacts 853 and 854 of the route relay R850. At the present time, the route relay R850 occupies its restored position, whereby the route conductor R is connected via the contacts 843 and 854 to the fourth marking conductor M4 in the group of marking conductors 890, corresponding to the selection of a routing digit 4, to be transmitted to the Strowger mechanism 660 terminating the link 500, since the first choice route between the RA6 office and the WA2 office includes the trunk lines 230, etc., terminated by the trunk circuits 231, etc., provided with the outgoing trunk 233, etc., terminating in the fourth level of the Strowger mechanism 660, as illustrated in Fig. 2. Recapitulating, it will be appreciated that the recapture relay R840 is operated not only to recapture the first office code digit 9 that has been dialed at the calling subscriber substation T1 and employed in the operation of the first selector 410 to select the trunk 510 extending to the link 500, but the recapture relay R840 registers the first office code digit 9 in the link 500 and selects a routing digit to be employed in the subsequent operation of the Strowger mechanism 660, the routing digit first selected depending upon the restored position of the route relays R850 and R860 and corresponding to the first choice route between the RA6 office and the WA2 office, as explained more fully hereinafter.

Further, upon operating the hold relay R540 completes, at the contacts 541, a loop circuit, including the impulsing conductors 924 and 925, as well as the windings 626 and 627 of the repeater 625, for energizing in series the upper and lower windings of the line relay R590, the loop circuit mentioned further including the contacts 911 and 921 between the impulsing conductors 924 and 925; whereby the line relay R590 is operated. Upon operating, the line relay R590 completes, at the contacts 593, a circuit, including the contacts 657, for operating the hold relay R610. Upon operating, the hold relay R610 completes, at the contacts 611, a multiple path, including the contacts 573, for applying ground potential to the conductor 595; and prepares, at the contacts 612, a circuit for operating the vertical magnet M664 of the Strowger mechanism 660 in series with the winding of the series relay R635. Also the hold relay R610 completes, at the contacts 616, a path, including the contacts 557 and 912, for applying ground potential to the impulsing cam 926 that is constantly rotating, as previously noted. The impulsing cam 926 operates to transmit the ground impulses via the contacts 932 to the rotary magnet DS3 of the digit send switch DS, whereby the rotary magnet DS3 operates and restores intermittently, driving the wipers DS1 and DS2 step by step in the clockwise direction. More particularly, each time the rotary magnet DS3 operates, it conditions the wipers DS1 and DS2 to be driven one step in the clockwise direction; and each time the rotary magnet DS3 restores, it drives the wipers DS1 and DS2 the step noted. At this time the send sequence switch 1SS occupies its home position applying ground potential to the route conductor R and via the contacts 843 and 854 to the fourth marking conductor M4 in the group of marking conductors 890. When the wiper DS2 of the digit send switch DS is driven out of its home position into engagement with the first contact in the associated contact bank, ground is applied to the terminated multiple, whereby the shunt relay R920 is operated. Upon operating, the shunt relay R920 interrupts, at the contacts 921, the shunt path across the impulsing conductors 924 and 925, whereby only the path, including the contacts DS5, is completed across the impulsing conductors 924 and 925 at this time. Also, the shunt relay R920 completes, at the contacts 922, a circuit, including the contacts 934, for operating the rotary magnet 1SS3 of the send sequence switch 1SS; whereby the rotary magnet 1SS3 operates to condition the wipers 1SS1 and 1SS2 to be driven one step in the clockwise direction out of their home positions subsequently incident to the deenergization of the rotary magnet 1SS3, as explained more fully hereinafter.

Accordingly, the next time the rotary magnet DS3 operates, it interrupts, at the contacts DS5, the impulsing path across the impulsing conductors 924 and 925 so as to cause the line relay R590 to restore; thereafter the rotary magnet DS3 restores in order to recomplete, at the contacts DS5, the impulsing path across the impulsing conductors 924 and 925 so as to effect reoperation of the line relay R590. Thus it will be understood that after the rotary magnet DS3 of the digit send switch DS effects operation of the shunt relay R920 impulses are transmitted, at the contacts DS5, over the impulsing conductors 924 and 925 to the line relay R590, whereby the latter relay follows. Each time the line relay R590 restores and then reoperates, it interrupts and then recompletes, at the contacts 593, the circuit energizing the winding of the hold relay R610, whereby the latter relay is retained in its operated position during impulsing since it is of the slow-to-release type. Also each time the line relay R590 restores and then reoperates, it completes and then interrupts, at the contacts 594, the previously-mentioned circuit, including the contacts 657 and 612, for energizing the winding of the series relay R635 and for operating the vertical magnet M664 of the Strowger mechanism 660, whereby the series relay R635 operates and remains operated during impulsing, as it is of the slow-to-release type, and the vertical magnet M664 operates and restores intermittently in order to drive the wiper shaft of the Strowger mechanism 660 step by step in the vertical direction away from its normal vertical position. When the wiper shaft of the Strowger mechanism 660 is driven one step in the vertical direction away from its normal vertical position, the sets of switch springs S632 and S633 are operated, for a purpose more fully explained hereinafter. After the rotary magnet DS3 of the digit send switch DS has operated and restored four times following the operation of the shunt relay R920 to effect the transmission of four impulses via the contacts DS5, comprising the route digit 4, to the line relay R590, the wiper DS1 engages the fifth contact in the associated contact bank terminating the grounded marking conductor M4 in the group of marking conductors 890, whereby ground potential applied thereto is extended to the winding of the digit stop-send relay R930, causing the latter relay to operate. Upon operating, the stop-send relay R930 completes, at the contacts 935, a holding circuit, including the contacts 923, for energizing the winding thereof; and completes, at the contacts 931, a shunt connection across the impulsing conductors 924 and 925 so as to insure the termination of the present digit by retaining the line relay R590 in its operated position. Accordingly, in the present example, the route digit 4 registered in the link 500 is sent by the digit send switch DS2 to the line relay R590 and repeated thereby to the vertical magnet M664, whereby the wipers 661, etc., are driven to the fourth level in the associated contact bank, terminating the group of outgoing trunks 233, etc., extending to the trunk circuits 231, etc., terminating the trunk lines 230, etc., extending directly from the RA6 office to the WA2 office and constituting a first choice route therebetween.

More particularly, upon operating the series relay R635 completes, at the contacts 636, a circuit, including the contacts 611 and 666, for operating the step relay R640; whereby the latter relay completes, at the contacts 641, a holding circuit, including the contacts 666, for energizing the winding thereof. Now at the conclusion of the route digit 4, the line relay R590 is retained in its operated position, as previously noted, in order to retain operated the hold relay R610 and to cause the series relay R635 to restore shortly thereafter, the latter relay being of the slow-to-release type. Upon restoring, the series relay R635 completes, at the contacts 637, a circuit, including the contacts 611 and 642, for operating the rotary magnet M665; whereby the wiper shaft of the Strowger mechanism 660 is driven one step in the rotary direction away from its normal rotary position so that the wipers 661, etc., select the first trunk in the previously selected group. Also upon operating, the rotary magnet M665 interrupts, at the contacts 666, the holding circuit for retaining operated the step relay R640. Upon restoring, the step relay R640 interrupts, at the contacts 642, the circuit for retaining operated the rotary magnet M665. At this time, ground potential appears upon the control conductor of the selected trunk in the event it is busy; whereby a circuit, including the control wiper 663 and the contacts 654 and 666, for reoperating the step relay R640 is completed. Upon reoperating the step relay R640 recompletes, at the contacts 642, the circuit for reoperating the rotary magnet M665; whereby the wiper shaft of the Strowger mechanism 660 is driven an additional step in the rotary direction so that the wipers 661, etc., select the next trunk in the previously selected group. Also the rotary magnet M665 effects the restoration of the step relay R640; and the latter relay upon restoring effects the restoration of the rotary magnet M665 so that the presently selected trunk in the selected group is tested in the manner described above. When an idle trunk in the selected group is selected by the wiper set, battery potential upon the control conductor thereof is applied to the control wiper 663 to complete a path, including the contacts 654 and 666, for short-circuiting the winding of the step relay R640; and to complete a multiple circuit, including the contacts 654 and 611, for energizing the winding of the switchthrough relay R650 causing the latter relay to operate.

Upon operating, the switchthrough relay R650 interrupts, at the contacts 654, the original operating circuit therefor; completes, at the contacts 655, a direct path for applying ground potential, at the contacts 611, to the control wiper 663; and completes, at the contacts 651 and 653, a bridge, including the windings 628 and 629 of the repeater 625, the contacts 591 and the upper winding of the answer relay R620 across the line wipers 661 and 662. Accordingly, at this time, an operative connection is completed between the link 500 via the Strowger mechanism 660 to the trunk circuit terminating the selected outgoing trunk; such, for example, as the trunk circuit 231 terminating the selected outgoing trunk 233 whereby the trunk circuit 231 governs over the trunk line 230 the trunk circuit in the WA2 office that terminates the trunk line 230; whereby the line switch individual to the trunk circuit mentioned in the WA2 office selects an incoming link therein which has a finder individual thereto that has preselected an idle register translator in the WA2 office. Hence at this time, the connection has been extended from the RA6 office to the WA2 office via the trunk line 230, and a register translator in the WA2 office has been operatively connected to the trunk line 230.

Reverting to the link 500, upon operating the switchthrough relay R650 is retained in its operated position by a holding circuit, including the grounded control wiper 663, the contacts 655 and 666, as well as the windings of the switchthrough relay R650 and the step relay R640; however, the step relay R640 is not reoperated via the above traced holding circuit since it is of the marginal type. Further, the switchthrough relay R650 completes, at the contacts 652, a circuit, including the contacts 611, for energizing the lower winding of the answer relay R620 so as to render the latter relay operative when the upper winding thereof is subsequently energized by a current of the opposite polarity than that to which is now supplied thereto over the connection including the trunk line 230, the answer relay R620 being of the polarized type. Further, the switchthrough relay R650 prepares, at the contacts 656, a circuit traced hereinafter, for energizing the winding of the shunt relay R630; and interrupts, at the contacts 657, the circuit for energizing the winding of the hold relay R610 so as to cause the latter relay to restore shortly thereafter, it being of the slow-to-release type. Finally, the switchthrough relay R650 completes, at the contacts 658 and 659, ground connections in multiple to the contacts 614 and 615, for a purpose more fully explained hereinafter; and completes, at the contacts 659′, a multiple around the contacts 616 in order to insure the continued application of ground potential to the impulsing cam 926. Upon restoring, the hold relay R610 interrupts, at the contacts 611, one of the multiple paths for retaining operated the switchthrough relay R650; however the latter relay is retained in its operated position at this time both by the operated hold relay R540 and by the return of ground potential over the control wiper 663 of the Strowger mechanism 660.

Continuing now with the operation of the digit send switch DS, the stop-send relay R930 also interrupts, at the contacts 932, the circuit for operating intermittently the rotary magnet DS3 from the impulsing cam 926; and completes, at the contacts 933, an alternative interrupter circuit, including the contacts DS4 and the multiple engaged by the grounded wiper DS2, for operating the rotary magnet DS3. Accordingly, the rotary magnet DS3 operates buzzer-fashion by virtue of the interrupter contacts DS4, in its operating circuit so that the wipers DS1 and DS2 are driven step by step in the clockwise direction back into their home positions; whereby the wiper DS2 disengages the multiple in the associated contact bank interrupting the operating circuit for the rotary magnet DS3 and the multiple circuit for energizing the winding of the shunt relay R920. Accordingly, further operation of the digit send switch DS is arrested at this time, and the shunt relay R920 restores shortly thereafter, it being of the slow-to-release type. Also incident to the operation of the stop-send relay R930 there was interrupted, at the contacts 934, the circuit for energizing the rotary magnet 1SS3 of the send sequence switch 1SS; whereby the rotary magnet 1SS3 restored to drive the wipers 1SS1 and 1SS2 out of their home positions to engage the first contacts in the associated contact banks. In passing, it is noted that when the wipers 1SS1 and 1SS2 of the send sequence switch 1SS are driven out of their home positions, the set of switch springs 1SS5 is operated, for a purpose more fully explained hereinafter. At this time, the grounded wiper 1SS1 of the send sequence switch 1SS disengages the home contact terminating the route conductor R and engages the first contact terminating the first code conductor 1C in the associated contact bank, whereby ground potential is applied to the first code conductor 1C and consequently to the ninth marking conductor M9 in the group of marking conductors 890 by virtue of the operated position of the recapture relay R840 provided with the operated contacts 844.

Upon restoring, the shunt relay R920 recompletes, at the contacts 921, the shunt across the impulsing conductors 924 and 925; interrupts, at the contacts 922, a further point in the circuit for operating the rotary magnet 1SS3 of the send sequence switch 1SS; and interrupts, at the contacts 923, the holding circuit for energizing the winding of the stop-send relay R930 in order to cause the latter relay to restore shortly thereafter, it being of the slow-to-release type. Upon restoring, the stop-send relay R930 interrupts, at the contacts 931, the other shunt across the impulsing conductors 924 and 925; recompletes, at the contacts 932, the original circuit for operating the rotary magnet DS3 of the digit-send switch DS; interrupts, at the contacts 933, a further point in the interrupter circuit for operating the rotary magnet DS3; and reprepares at the contacts 934, the circuit for operating the rotary magnet 1SS3 of the send sequence switch 1SS.

Accordingly, at this time the rotary magnet DS3 of the digit send switch DS operates intermittently; whereby the first office code digit 9 is sent, at the contacts DS5, over the impulsing conductors 924 and 925 to the line relay R590 following operation of the shunt relay R920 in the manner described above. In the present example, after the rotary magnet DS3 has operated and restored ten times transmitting the nine impulses of the first office code digit 9 the wiper DS1 of the digit send switch DS engages the tenth contact in the associated contact bank terminating the ninth marking conductor M9 in the group of marking conductors 890 having ground potential thereupon; whereby the stop-send relay R930 is reoperated, in the manner previously explained in order to terminate the transmission of the first office code digit 9.

The line relay R590 follows the impulses of the first office code digit 9. Each time the line relay R590 restores and then reoperates, it completes and then interrupts, at the contacts 592, the previously mentioned circuit for energizing the winding of the shunt relay R630 in order to cause the latter relay to operate and remain operated during impulsing as it is of the slow-to-release type. Upon operating, the shunt relay R630 completes, at the contacts 631, a path for shorting the winding 628 of the repeaters 625 and the upper winding of the answer relay R620 in order to improve impulsing over the line wipers 661 and 662 of the Strowger mechanism 660 and consequently over the trunk line 230 extending to the WA2 office. Also each time the line relay R590 restores and then reoperates, it interrupts and then recompletes, at the contacts 591, the previously traced bridge across the line wipers 661 and 662 of the Strowger mechanism 660 so as to repeat the impulses of the present first office code digit 9 over the trunk line 230; whereby the first office code digit 9 is registered in the WA2 office in the register translator that is operatively connected to the trunk line 230 at this time.

At the conclusion of the transmission of the first office code digit 9, the digit send switch DS is returned back into its home position effecting the restoration of the shunt relay R920 and operation of the rotary magnet 1SS3 of the send sequence switch 1SS in a manner identical to that explained above. At this time, the grounded wiper 1SS1 engages the second contact in the associated contact bank terminating the second code conductor 2C that is also terminated by the wiper O21 of the office code register O2, whereby the subsequent operation of the link 500 is dependent upon whether the subscriber at the calling subscriber substation T1 has dialed the second office code digit 2 by this time. First assuming that the subscriber at the calling subscriber substation T1 has not had an opportunity to dial the second office code digit 2 at this time, the wiper O21 of the office code register O2 engages its home contact in the associated contact bank completing a multiple circuit for energizing the stop-send relay R930 so as to retain the latter relay in its operated position, whereby further operation of the digit send switch DS is arrested until the subscriber at the calling subscriber substation T1 has an opportunity to register the second office code digit 2 in the office code register O2.

Recapitulating, it will be understood that as a mere consequence of the seizure of the link 500, the digit send switch DS was operated to send the route digit 4 followed by the recaptured first office code digit 9 so that the Strowger mechanism 660 was operated to select the trunk line 230 extending from the RA6 office to the WA2 office and then the line relay R590 was operated to repeat the recaptured first office code digit 9 over the trunk line 230 so that the first office code digit 9 is registered in the register translator in the WA2 office.

Again reverting to the seizure of the link 500, incident to operation of the hold relay R610, there was completed, at the contacts 614, a path, including the contacts 563, for applying ground potential to the start conductor 527 extending to the allotter 520; and there was completed, at the contacts 615, a path for applying ground potential via the winding of the identity relay R570 and the contacts 564 to the individual conductor 528 extending between the link 500 and the allotter 520. The application of ground potential to the start conductor 527 insures subsequent operation of the rotary magnet M523 of the finder 521 so that the wiper 522 ultimately selects the conductor 528 extending between the allotter 520 and the link 500. More particularly, the application of ground potential to the start conductor 527 completes a circuit, including the contacts 526 and 524, for operating the rotary magnet M523 of the finder 521. The rotary magnet M523 operates buzzer-fashion by virtue of the inclusion of the interrupter contacts 524 in the operating circuit thereof, driving the wiper 522 step by step in the clockwise direction until the contact in the associated contact bank terminating the conductor 528 is engaged; at which time a series circuit is completed for energizing the windings of the identity relay R570 and the stop relay R525, causing the relays mentioned to operate. Upon operating, the stop relay R525 interrupts, at the contacts 526, the circuit for operating the rotary magnet M523 so as to arrest further operation of the finder 521 at this time.

Upon operating, the identity relay R570 completes, at the contacts 571, a circuit for operating the gang relay R710, whereby the latter relay completes, at the contacts 711, etc., connections between the four groups of marking conductors T740, H740, D740 and U740 in the marking cable 740, and the four groups of marking conductors T370, H370, D370 and U370 in the marking cable 370. The groups of marking conductors T740, H740, D740 and U740 in the marking cable 740 extend to the respective digit registers 1001, 1002, 1003 and 1004 in the link 500. The digit registers 1001, 1002, 1003 and 1004 each comprises a set of four WXYZ storage relays; and the registers 1001, 1002, 1003 and 1004 are adapted respectively to register the thousand digit, the hundred digit, the ten digit and the unit digit of the directory number of the calling subscriber line 7930. As illustrated, the T digit register 1001 comprises the four WXYZ relays illustrated that are provided with upper and lower windings, battery potential being applied via the upper windings of the W, X, Y and Z relays to the corresponding W, X, Y and Z conductors in the associated group of WXYZ marking conductors T740 in the marking cable 740. Accordingly, at this time battery potential is applied via the upper windings of the four WXYZ storage relays in the four registers 1001, 1002, 1003 and 1004 to the corresponding WXYZ marking conductors in the four groups T370, H370, D370 and U370 in the marking cable 370 extending back to the line circuits 300, etc., terminating the subscriber lines 7930, etc.

Also, upon operating the identity relay R570 interrupts, at the contacts 573, the path for applying ground potential to the conductor 595; and completes, at the contacts 572, a path for applying booster battery potential from the booster battery 516 via the resistor 515 to the conductor 595 and consequently to the control conductor 515 of the trunk 510. The application of booster battery potential to the control conductor 515 of the trunk 510 brings about the application of booster battery potential to the control conductor 353 of the subscriber line 7930, whereby the cutoff relay R310 is retained in its operated position and the gaseous discharge tubes 371, 372, 373, 374 and 375 are rendered conductive by virtue of application of battery potential to the various WXYZ marking conductors in the groups T370, etc., in the marking cable 370 at this time. For example, the tube 371 is rendered conductive effecting the energization of the upper winding of the W relay in the T digit register 1001 in the link 500 via the W marking conductor in the group T370 in the marking cable 370. Specifically, the W relay in the T register 1001 operates partially via the completed circuit for energizing the upper winding thereof so as to close the contacts W2 thereof, whereby the W relay mentioned operates fully to complete a holding circuit, including the grounded hold conductor 1017 for energizing the lower winding thereof, the hold conductor 1017 being grounded at the contacts 1016. Thus the operation of the W relay in the T register 1001 is effective to register the digit 7 therein. In a similar manner, the conduction of the tube 372 registers the digit 9 by operating the Y relay in the H register 1002; the conduction of the tubes 373 and 374 register the digit 3 by operating the W and Z relays in the D register 1003; and the conduction of the tube 375 registers the digit 0 by operating the Z relay in the U register 1004. Accordingly, at this time, the four digits of the directory number 7, 9, 3 and 0 of the calling subscriber line 7930 are respectively registered in the four registers 1001, 1002, 1003 and 1004 in the link 500.

Also, upon operating the W relay in the T register 1001 completes, at the contacts W1, a path for applying ground potential to the conductor 1018 so as to effect operation of the register relay R560 so as to interrupt, at the contacts 563 and 564, the paths for applying ground potential to the conductors 527 and 528 extending to the allotter 520, whereby the identity relay R570 and the stop relay R525 restore. Upon restoring the identity relay R570 interrupts, at the contacts 571, the circuit for retaining operated the gang relay R710 so as to bring about the disconnection of the marking cables 740 and 370. Also the identity relay R570 interrupts, at the contacts 572, the path for applying booster battery potential to the conductor 595; and recompletes, at the contacts 573, the path for applying ground potential to the conductor 595. When booster battery potential is removed from the conductor 595 and ground potential is returned thereto, further points in the circuits for rendering conductive the gaseous discharge tubes 371, etc., is interrupted, whereby all of the tubes 371, etc., are again rendered nonconductive. Upon restoring, the stop relay R525 in the allotter 520 reprepares, at the contacts 526, the circuit for operating the rotary magnet M523 of the finder 521 so that the finder 521 may be further operated in the event ground potential in one of the other toll recording links is applied to the common start conductor 527 at this time. Accordingly, it will be understood that the allotter 520 is operated to bring about the sequential operation of the various identity relays R570, etc., in the various links 500, etc., so that the calling lines 7930, etc., operatively connected to the links 500, etc., may be sequentially identified and the directory numbers thereof registered therein.

Again reverting to the seizure of the link 500 via the trunk 510, the line relay R530 is in readiness to follow the second office code digit 2 dialed at the calling subscriber substation T1 as soon as the subscriber thereat has an opportunity to dial the second office code digit 2 following the seizure of the link 500 via the trunk 510. Each time the line relay R530 restores and then reoperates, it interrupts and then recompletes, at the contacts 531, the circuit for energizing the winding of the hold relay R540 in order to retain the latter relay in its operated position during impulsing, the hold relay R540 being of the slow-to-release type. Also each time the line relay R530 restores and then reoperates, it completes and then interrupts, at the contacts 533, a path, including the contacts 543, for energizing the winding of the series relay R810 in series with the rotary magnet O22 of the office code register O2, this series circuit including the wiper 1RS1 of the register sequence switch 1RS and the engaged home contact in the associated contact bank. Thus the series relay R810 operates and remains operated during impulsing as it is of the slow-to-release type and the rotary magnet O22 of the office register O2 operates and restores twice in order to register the second office code digit 2 in the office register O2. Upon operating, the series relay R810 completes, at the contacts 812, a circuit for operating the step relay R815; and upon operating the step relay R815 prepares, at the contacts 816, a circuit for operating the rotary magnet 1RS2 of the register sequence switch 1RS. At the conclusion of the dialing of the second office code digit 2 at the calling subscriber substation T1, the line relay R530 is retained in its operated position in order to retain operated the hold relay R540, and to retain interrupted, at the contacts 533, the series circuit for energizing the winding of the series relay R810 so as to cause the latter relay to restore shortly thereafter, it being of the slow-to-release type. Upon restoring, the series relay R810 interrupts, at the contacts 812, the circuit for energizing the winding of the step relay R815, in order to cause the latter relay to restore shortly thereafter, it being of the slow-to-release type. Also the series relay R810 completes, at the contacts 811, the previously mentioned circuit for operating the rotary magnet 1RS2 of the register sequence switch 1RS, whereby the wiper 1RS1 is driven one step in the clockwise direction to select the first contact in the associated contact bank terminating the conductor extending to the operating magnet O32 of the office register O3. Upon restoring, the step relay R815 interrupts, at the contact 816, the circuit for operating the rotary magnet 1RS2.

In view of the foregoing description of the manner in which the second office code digit 2 dialed at the calling subscriber substation T1 is received by the line relay R530 and repeated thereby and registered in the second office code register O2, it will be understood that in a similar manner the third office code digit 2, the first numerical digit 1, the second numerical digit 2, the third numerical digit 3, and the fourth numerical digit 4, dialed at the calling subscriber substation T1 are received by the line relay R530 and respectively repeated thereby and registered in the third office code register O3 and the first numerical register N1, the second numerical register N2, the third numerical register N3, and the fourth numerical register N4. When the second office code digit 2, the third office code digit 2, the first numerical digit 1, the second numerical digit 2, the third numerical digit 3 and the fourth numerical digit 4 are respectively registered in the second office code register O2, the third office code register O3, the first numerical register N1, the second numerical register N2, the third numerical register N3, and the fourth numerical register N4, the sets of switch springs O24, O34, N14, N24, N34 and N44 are operated respectively to prepare the associated release magnets O23, O33, N13, N23, N33 and N43 of the respective registers O2, O3, N1, N2, N3 and N4.

In the foregoing description of the operation of the digit send switch DS to send the route digit 4 followed by the recaptured first office code digit 9, it was assumed that when the grounded wiper 1SS1 engaged the second contact in the associated contact bank terminating the conductor extending to the wiper O21 of the second office code register O2 that the subscriber at the calling subscriber substation T1 had not yet dialed the second office code digit 2, whereby the stop-send relay R930 was retained in its operated position to prevent further operation of the digit send switch DS. Thus when the second office code digit 2 is dialed at the calling subscriber substation T1 and registered in the second office code register O2, the wiper O21 is driven out of its home position into engagement with the second contact in the associated contact bank terminating the second marking conductor M2 in the group of marking conductors 890 so as to apply ground potential thereto in order to effect the registration in the second office register O2 of the second code digit 2. Moreover when the wiper O21 of the second office code register O2 disengages the home contact in the associated contact bank, the circuit for energizing the winding of the stop-send relay R930 is interrupted so that the latter relay restores shortly thereafter, it being of the slow-to-release type. Upon restoring the stop-send relay R930 initiates reoperation of the digit send switch DS to send the second office code digit 2 register in the second office register O2 in a manner identical to that previously described, whereby the stop-send relay R930 is reoperated and the digit send switch DS is returned back into its home position effecting the restoration of the shunt relay R920 and the restoration of the stop-send relay R930, assuming that the third office code digit 2 is registered in the third office register O3 at this time.

Thus it will be understood that the digit send switch DS is operated to send the second office code digit 2, the third office code digit 2, the first numerical digit 1, the second numerical digit 2, the third numerical digit 3, and the fourth numerical digit 4, respectively registered in the registers O2, O3, N1, N2, N3 and N4 to the line relay R590, whereby the latter relay repeats the digits mentioned over the connection including the trunk line 230 to the register translator in the WA2 office. Accordingly, it will be understood that after the Strowger mechanism 660 operates to bring about the selection of the trunk line 230 that the three office code digits 9, 2, 2 and the four numerical digits 1, 2, 3 and 4 are sent thereover, whereby all of the digits mentioned are registered in the register translator in the WA2 office so that the register translator mentioned may proceed with the control of the switching apparatus therein to bring about the extension of the connection to the called subscriber substation therein.

Reverting to the operation of the link 500 following the transmission of the fourth numerical digit 4 from the fourth numerical register N4, the send sequence switch 1SS is operated into its eighth position so that the grounded wiper 1SS applies ground potential to the terminated conductor completing a circuit, including contacts 914 and 532, for operating the switch relay R550. Upon operating, the switch relay R550 completes, at the contacts 555, a holding circuit, including the contacts 573 and 542 for energizing the winding thereof; prepares, at the contacts 556, a circuit, traced hereinafter, for energizing the upper winding of the record relay R580; and interrupts, at the contacts 557, the application of ground potential to the impulsing cam 926 so as positively to arrest further operation of the digit send switch DS at this time. Also the switch relay R550 interrupts, at the contacts 551 and 553, the loop circuit extending from the calling subscriber substation T1 to the upper and lower windings of the line relay R530; and completes, at the contacts 552 and 554, an alternative loop circuit extending to the upper and lower windings of the line relay R590 via the windings 626 and 627 of the repeater 625. Accordingly, the line relay R530 restores interrupting, at the contacts 531, the circuit for retaining operated the hold relay R540 so as to cause the latter relay to restore shortly thereafter, it being of the slow-to-release type. Upon restoring, the hold relay R540 interrupts, at the contacts 541, the bridge path, including the impulsing conductors 924 and 925 across the windings 626 and 627 of the repeater 625. Also the hold relay R540 interrupts, at the contacts 542, the multiple holding circuits for retaining operated the switch relay R550 and the switchthrough relay R650; however, the latter relays are retained in their operated position at this time by the return of ground potential over the control wiper 663 of the Strowger mechanism 660. Finally the hold relay R540 prepares, at the contacts 544, a path traced hereinafter, for applying ground potential to the release conductor 546.

With regard to the operation of the register translator in the WA2 office, it may be first assumed that the called subscriber substation therein is busy, whereby the local switch train therein operates to return a busy tone signal back over the connection, including the trunk line 230, whereby the busy tone signal traverses the windings 628 and 629 of the repeaters 625, the shunt relay R630 having restored shortly following the transmission of the fourth numerical digit 4, by the line relay R590. The busy tone signal traversing the windings 628 and 629 of the repeater 625 induces a corresponding busy tone signal in the windings 626 and 627 thereof which busy tone signal is returned over the calling loop circuit to the calling subscriber substation T1 in the RA6 office.

The subscriber at the calling subscriber substation T1 in the RA6 office then disconnects interrupting the loop circuit extending to the line relay R590 in the link 500 in order to cause the latter relay to restore and interrupts, at the contacts 591, the loop circuit extending between the upper winding of the answer relay R620 and the outgoing connection, whereby the trunk circuit 231 terminating the trunk line 230 brings about the removal of ground potential from the control wiper 663 of the Strowger mechanism 660. When ground potential is thus removed from the control wiper 663, the holding circuit for retaining operated the switchthrough relay R650 is interrupted, whereby the latter relay restores and completes, at the contacts 657, the previously mentioned circuit, including the contacts 594 and 613, the set of switch springs S632 and the contacts 584 and 556, for energizing the upper winding of the record relay R580. Also the removal of ground potential from the control wiper 663 interrupts the previously traced multiple holding circuit for energizing the winding of the switch relay R550; however the latter relay does not restore at this time as it is of the slow-to-release type. Also the switchthrough relay R650 completes, at the contacts 657, a multiple circuit, including the contacts 594 and 613, and the set of switch springs S633, for operating the release magnet M667, whereby the wiper shaft of the Strowger mechanism 660 is released and returned back into its normal rotary and vertical positions so as to open the sets of switch springs S632 and S633.

Upon operating the record relay R580 completes, at the contacts 582 and 583, a holding circuit, including the grounded release conductor 1017, for energizing the upper winding thereof; and completes, at the contacts 581, an alternative holding circuit, including the contacts 573 and 555, for retaining operated the switch relay R550. Also this reapplication of ground potential to the contacts 573 reapplies ground potential to the conductor 595 so as to retain operated the recapture relay R840 and consequently the lockout relay R820 so that the trunk 510 is again marked as busy to the various first selectors 410, etc., having access thereto. In the short time interval between the removal of ground potential from the control wiper 663 of the Strowger mechanism 660, and the consequent removal of ground potential from the conductor 595, and the reapplication of ground potential to the conductor 595 as a consequence of operation of the record relay R580, ground potential is momentarily removed from the control conductors 515, etc., of the trunk 510 and then reapplied thereto as explained above. This momentary removal of ground potential from the control conductor 515 of the trunk 510 brings about the release of the first selector 410 and the finder 360 as well as the restoration of the cutoff relay R310 in the line circuit 300. Upon restoring the cutoff relay R310 again bridges, at the contacts 311 and 312, the upper and lower windings of the line relay R320 across the line conductors 352 and 351 of the subscriber line 7930. Further, at this time, battery potential via the winding of the cutoff relay R310 is again applied to the control conductor 354 of the subscriber line 7930 in order again to mark the subscriber line 7930 as idle to the connectors in the local switch train having access thereto.

Continuing now with the release of the link 500, upon operating the record relay R580 also completes, at the contacts 585, a path for applying ground potential to one terminal of the winding 708 carried by the recording head 706, the other terminal of the winding 708 being connected directly to the wiper RSS1 of the record sequence switch RSS. Further, the record relay R580 completes, at the contacts 586, a path for applying ground potential to the conductor 1033 so as to effect operation of the motor 704 and the gang relay R1030, as well as the application of ground potential to the constantly rotating impulsing cam 1045. The operating motor 704 drives the reel 703 through the power transmission 705 so that the elongated paramagnetic medium 701 is unwound from the reel 702 and wound upon the reel 703, the medium 701 being drawn across the pole tabs 707 of the sensing head 706 in cooperating relation therewith, as explained more fully below.

Upon operating the gang relay R1030 completes, at the contacts 1031, etc., connections including the condensers 1032, etc., between eleven sources of audible frequency extending to eleven corresponding tone or frequency generators and the ten marking conductors M1 to M0, inclusive, in the group of marking conductors 890 and the conductor 1055. Thus frequency No. 1 is connected to the first marking conductor M1, and frequency No. 11 is connected to the conductor 1055. The impulsing cam 1045 operates to energize the rotary magnet RSS2 intermittently at about twenty impulses per second; whereby the wiper RSS1 is driven in the counterclockwise direction at this rate across the contacts in the associated contact bank. When the wiper RSS1 is driven out of its home position, the set of switch springs RSS4 is operated to prepare a circuit traced hereinafter for operating the release magnet RSS3.

At this time, the seventh, second and sixth marking conductors M7, M2 and M6 in the marking group 890 are connected to the respective seventh, second and sixth audible frequencies by virtue of the operated gang relay R1030; and the marking conductors mentioned are respectively strapped to the second, third and fourth contacts of the record sequence switch RSS by the permanent straps 1047 thereby permanently to register the calling office code RA6 (726) in the record sequence switch RSS. The home and first contacts in the contact bank of the record sequence switch RSS are vacant; while the fifth, sixth, seventh and eighth contacts therein are respectively connected to the conductors 1051, 1052, 1053 and 1054 that respectively extend to the T register 1001, the H register 1002, the D register 1003 and the U register 1004. The ninth, seventeenth, twentieth, twenty-first and twenty-second contacts in the contact bank of the record sequence switch RSS are connected to the conductor 1055 having the eleventh audible frequency connected thereto by virtue of the operated position of the gang relay R1030. The tenth, eleventh, twelfth, thirteenth, fourteenth, fifteenth and sixteenth contacts in the contact bank of the record sequence switch RSS are respectively connected to the conductor 1C, 2C, 3C, 1N, 2N, 3N and 4N in the cable 870. The eighteenth, nineteenth and twenty-third contacts in the contact bank of the record sequence switch RSS are respectively connected to the conductors 1056, 1057 and 1058. Also the record sequence switch RSS is provided with a grounded interior contact 1046 that is arranged in radial alignment with the twenty-third contact terminating the conductor 1058 so that the wiper RSS1 simultaneously engages the contact 1046 and the twenty-third contact for a purpose more fully explained hereinafter. At this time, the W relay in the T register 1001 is operated by virtue of the registration of the thousand digit 7 in the T register 1001, whereby the conductor 1051 is connected via the contacts W3 of the operated W relay and the back contacts of the X, Y and Z relays to the seventh marking conductor M7 in the marking cable 890. Similarly, the conductors 1052, 1053 and 1054 are respectively connected via the various combinations of WXYZ relays in the respective H register 1002, D register 1003 and U register 1004 to the respective ninth, third and tenth marking conductors M9, M3 and M0 in the marking group 890. The conductor 1C in the cable 870 is connected at the contacts 844 of the operated recapture relay R840 to the ninth marking conductor M9 in the marking group 890 by virtue of the circumstance that the first digit of the called office code was 9. The conductors 2C, 3C, 1N, 2N, 3N and 4N in the cable 890 are respectively terminated upon the wipers O21, O31, N11, N21, N31 and N41 of the respective registers O2, O3, N1, N2, N3 and N4 that have the respective digits 2, 2, 1, 2, 3 and 4 registered therein, thereby completing connections to the respective marking conductors M2, M2, M1, M2, M3 and M4 in the marking group 890. The conductors 1056 and 1057 respectively extend to the wipers TT1 and UT1 of the respective ten minute timer TT and the unit minute timer UT, which wipers occupy their home positions, in the present example, by virtue of the circumstance that the present call was not answered and no time is registered in the respective registers TT and UT. Finally, the conductor 1058 extends to the winding of the release relay R1015, for a purpose more fully explained hereinafter.

Accordingly, when the wiper RSS1 engages the second contact in the associated contact bank, the seventh audible frequency applied to the marking conductor M7 is connected thereto and consequently through the winding 708 of the recording head 706 so that an oscillation of this audible frequency is recorded on the moving medium 701 since the motor 704 is operating at this time. Thus it will be understood that in the second, etc., positions of the wiper RSS1, the following digits are recorded by the recording head 706 upon the moving medium 701:

| Position of the Wiper RSS1 of the Record Sequence Switch RSS | Character of the Digit | Value of the Digit |
|---|---|---|
| 2 | First digit calling office code | 7 |
| 3 | Second digit calling office code | 2 |
| 4 | Third digit calling office code | 6 |
| 5 | First digit calling line number | 7 |
| 6 | Second digit calling line number | 9 |
| 7 | Third digit calling line number | 3 |
| 8 | Fourth digit calling line number | 0 |
| 9 | Separator digit | 11 |
| 10 | First digit called office code | 9 |
| 11 | Second digit called office code | 2 |
| 12 | Third digit called office code | 2 |
| 13 | First digit called line number | 1 |
| 14 | Second digit called line number | 2 |
| 15 | Third digit called line number | 3 |
| 16 | Fourth digit called line number | 4 |
| 17 | Separator digit | 11 |
| 18 | Ten digit of time | blank |
| 19 | Unit digit of time | blank |
| 20 | Separator digit | 11 |
| 21 | Separator digit | 11 |
| 22 | Separator digit | 11 |

Now when the wiper RSS1 of the record sequence switch RSS engages the twenty-third contact in the associated contact bank and the interior contact 1046, a circuit is completed for operating the release relay R1015; and a multiple path is completed for short-circuiting the winding 708 carried by the recording head 706. Upon operating the release relay R1015 interrupts, at the contacts 1016, the path for applying ground potential to the release conductor 1017 so as to effect the restoration of the WXYZ marking relays in the T register 1001, the H register 1002, the D register 1003 and the U register 1004 and to interrupt the holding circuit for energizing the upper winding of the record relay R580 so as to cause the latter relay to restore. Upon restoring, the record relay R580 interrupts, at the contacts 586, the circuit for operating the motor 704 so as to arrest operation of the magnetic recorder 700. Also the record relay R580 interrupts, at the contacts 586, the multiple circuit for retaining operated the gang relay R1030 and the multiple path for applying ground potential to the impulsing cam 1045 so as to arrest operation of the record sequence switch RSS at this time. Further, the record relay R580 interrupts, at the contacts 581, the alternative holding circuit for energizing the winding of the switch relay R550 so as to cause the latter relay to restore shortly thereafter, it being of the slow-to-release type. Also the record relay R580 interrupts, at the contacts 581, the alternative path for applying ground potential to the conductor 595 so as to deenergize the winding of the recapture relay R840 in order to cause the latter relay to restore shortly thereafter, it being of the slow-to-release type. Upon restoring, the recapture relay R840 interrupts, at the contacts 842, the circuit for retaining operated the lock-out relay R820 so that the latter relay recompletes, at the contacts 821, 823 and 825, the paths for applying battery potential via the windings of the recapture relays R840, R835 and R830 to the control conductors 515, 514 and 513 of the trunk 510 so as again to mark the trunk 510 as idle to the first selector 410, etc., having access thereto.

Now preceding the release of the switch relay R550 and the recapture relay R840 and incident to the restoration of the W relay in the T register 1001, the circuit for retaining operated the register relay R560 is interrupted, whereby the latter relay completes, at the contacts 561, a path for applying ground potential via the contacts 544 and 657 to the release conductor 546. The application of ground potential to the release conductor 546 completes a restoring circuit, including the contacts 1SS4 and the wiper 1SS2 of the send sequence switch 1SS for operating intermittently the rotary magnet 1SS3, whereby the send sequence switch 1SS is returned back into its home position to cause the wiper 1SS2 to disengage the multiple in the associated contact bank. Also the application of ground potential to the release conductor 546 completes direct multiple circuits respectively including the sets of switch springs 1RS4, O24, O34, N14, N24, N34, N44 and RSS4 for respectively operating the release magnets 1RS3, O23, O33, N13, N23, N33, N43 and RSS3 of the respective register sequence switch 1RS, the office register O2, the office register O3, the numerical register N1, the numerical register N2, the numerical register N3, the numerical register N4 and the record sequence switch RSS, whereby the register sequence switch 1RS and the record sequence switch RSS, as well as the office and numerical registers mentioned are released, these switches and registers being of the minor type so that the wipers thereof are returned back into their home positions. When the register sequence switch 1RS and the record sequence switch RSS and the registers O2, O3, N1, N2, N3 and N4 are thus released, the sets of switch springs 1RS4, RSS4, O24, O34, N14, N24, N34 and N44 are opened to deenergize the associated release magnets 1RS4, etc. At this time, the link 500 is completely released and is available for further use and a record has been prepared by the magnetic recorder 700 individual to the present call which record bears the items above set forth, including the "blanks" at the ten minute and unit minute items, which circumstance demonstrates that the present call was not completed as there was no timing of an established connection.

In further explanation of the record produced by the magnetic recorder 700, it will be appreciated from the data set forth above that the principal groups of items are separated by the separator digits 11, whereby the medium 701 may be employed in automatic magnetic-sensing apparatus for the purpose of producing a permanent record or bill in conjunction with the present call, the separator digits 11 being employed to coordinate the control of the machine noted. Further, it will be understood that upon the magnetic medium 701 a series of complete recordings are recorded in magnetic form indicative of the various calls that have been initiated and extended to the link 500 in the RA6 office and regardless of whether the calls have been completed or not. Of course, in conjunction with the completed call a time item appears in the record as explained more fully hereinafter that may be employed for the purpose of establishing the appropriate charge for the connection in conjunction with the calling office code RA6 and the particular called office code appearing in the record. Also it will be apparent that after an appropriate number of calls have been recorded by the magnetic recorder 700 a fresh medium 701 will be placed in the magnetic recorder 700 and the old medium 701 having the records thereon removed and transferred to the recording or billing machine previously noted. In this regard it will be appreciated that the arrangement of the magnetic recorders 700, etc., in the various links 500, etc., permits the recording or billing machine to be located at a central business office.

Again reverting to the operation of the link 500 in conjunction with the extension of the present call from the calling subscriber substation T1, it may occur that the called subscriber substation in the called WA2 office is idle incident to the operation of the local switch train in the WA2 office to extend the connection thereto, whereby ringing current is projected from the local switch train in the WA2 office over the called subscriber line to the called subscriber substation therein and ring-back tone current is returned over the connection including the trunk line 230 to the link 500. The ring-back tone current is repeated between the windings 628—629 and the windings 626—627 of the repeater 625 and consequently over the connection including the calling subscriber line 7930 to the calling subscriber substation T1 in the RA6 office so as to indicate to the subscriber thereat that the called subscriber in the WA2 office is being signalled at this time.

Subsequently, when the subscriber at the called subscriber substation in the WA2 office answers the call, the connector incorporated in the local switch train in the WA2 office operates to interrupt the projection of ringing current over the called subscriber line to the called subscriber substation in the WA2 office, to interrupt the return of ring-back tone over the connection including the calling subscriber line 7930 to the calling subscriber substation T1 in the RA6 office, and to reverse battery over the connection including the trunk line 230, whereby the polarity of the upper winding of the answer relay R620 in the link 500 is reversed causing the latter relay to operate. Upon operating, the answer relay R620 completes, at the contacts 621, a circuit for operating the start relay R730. Upon operating the start relay R730 completes, at the contacts 733, a holding circuit, including the grounded release conductor 1017, for energizing the winding thereof; and prepares, at the contacts 1031, a circuit for energizing the upper winding of the pick-up relay R720. Thereafter the timer cam 712 controlling the follower spring 713 closes the contacts 714; whereby the circuit, including the contacts 731 and 721, is completed for energizing the upper winding of the pick-up relay R720 so as to cause the latter relay to operate through its first step to close the contacts 722 in order to complete a path, including the contacts 732, for short-circuiting the lower winding thereof. Shortly thereafter, the timer cams 712 controls the follower spring 713 to open the contacts 714, whereby a series circuit, including the contacts 732 and 722 is completed for energizing the upper and lower windings of the pick-up relay R720 in series so as to cause the latter relay to operate through its second step in order to interrupt, at the contacts 721, a point in the original circuit for energizing the upper winding thereof; and to prepare, at the contacts 723, a circuit for operating the rotary magnet UT3 of the unit timer UT. After the expiration of one minute, the timer cam 712 again controls the follower spring 713 to close the contacts 714, whereby the circuit mentioned, including the contacts 723 and 587, is completed for operating the rotary magnet UT3 causing the latter magnet to condition the wipers UT1 and UT2 of the unit timer UT to be driven one step in the clockwise direction out of their home positions. Thereafter, when the timer cam 712 controls the follower spring 713 to open the contacts 714, the rotary magnet UT3 restores driving the wipers noted of the unit timer UT one step in the clockwise direction. As time proceeds, the timer cam 712 effects operation and restoration of the rotary magnet UT3, whereby the wipers noted of the unit timer UT are driven step by step to register minutes of elapsed time of the present connection completed via the link 500. In the event the connection is retained for a time interval of ten minutes, the grounded wiper UT2 of the unit timer UT engages the inside contact arranged in radial alignment with the tenth contact in the associated contact bank completing a circuit, including the contact 736 for operating the rotary magnet TT2 of the ten timer TT, whereby the wiper TT1 is driven one step in the clockwise direction out of its home position closing the contacts TT4 to prepare a circuit traced hereinafter for operating the release magnet TT3 of the ten timer TT. In view of the foregoing description, it will be understood that the unit timer UT operates to accumulate the unit minute intervals of the time duration of the present connection and that the ten timer TT operates to accumulate the ten minute intervals of the time duration of the present connection, the rotary magnet TT2 of the ten timer TT being operated each time the wiper UT2 of the unit timer UT engages the inside contact disposed in radial alignment with the tenth contact in the associated contact bank.

The timing of the present connection proceeds in the manner described above and until after the subscriber at the called subscriber substation in the WA2 office disconnects, whereby the connector in the local switch train in the WA2 office operates to reverse the polarity over the connection, including the trunk line 230 so as to cause the answer relay R620 in the link 500 to restore and until the subscriber at the calling subscriber substation T1 in the RA6 office disconnects bringing about the restoration of the line relay R590 and the consequent operation of the record relay R580, in the manner previously explained. Upon operating, the record relay R580 interrupts, at the contacts 587, the circuit for operating the rotary magnet UT3 of the unit timer UT so as to prevent the accumulation of additional time following the release by the subscriber at the calling subscriber substation T1 in the RA6 office. At this time, it may be assumed that a time item of 5 is registered in the unit timer UT and that a time item of 2 is registered in the ten timer TT corresponding to a time duration of twenty-five minutes of the established connection via the link 500. In this example, the operation of the record relay R580 brings about the operation of the magnetic recorder 700, in the manner previously explained, whereby the wiper RSS1 of the record sequence switch RSS connects the winding 708 carried by the recording head 706 to the conductors 1056 and 1057 respectively terminated by the eighteenth and nineteenth contacts in the associated contact bank to bring about the recording on the medium 701 of the ten time item of 2 and the unit time item of 5 together with the other items of record information previously explained. The subsequent release of the link 500 is the same as that previously described except that when ground potential is removed from the release conductor 1017 by the operation of the release relay R1015, the start relay R730 also restores. Upon restoring, the start relay R730 interrupts, at the contacts 732, the holding circuit for retaining operated the pick-up relay R720; and completes, at the contacts 735, a circuit, including the set of switch springs TT4, for operating the release magnet TT3 so as to bring about the release of the wiper TT1 of the ten timer TT, whereby the set of switch springs TT4 is opened. Also the start relay R730 completes, at the contacts 734, a connection between the multiple 1025 engaged by the grounded wiper UT2 of the unit timer UT and the contacts UT4 and the winding of the rotary magnet UT3, whereby the rotary magnet UT3 operates buzzer-fashion to drive the wipers UT1 and UT2 of the unit timer UT back into their home positions. It will be understood that in the present example the record produced by the magnetic recorder is the same as that previously described with the exception that the time items also appear upon the medium 701 instead of the blank spaces as described in the preceding example. The position of the time items upon the medium 701 is the same as that previously indicated. In this example, the presence of the time items upon the medium 701 and forming a part of the composite record permits the ready calculation of the appropriate charge for the present connection in view of the identification of the calling office RA6 and the called office WA2, which items also appear in the composite record mentioned.

Again reverting to the operation of the link 500 incident to the seizure thereof, it was explained that immediately the hold relay R160 operated following operation of the line relay R590 as a consequence of operation of the hold relay R540 by operation of the line relay R530 that the digit send switch DS was operated to send the route digit 4 established by the operated recapture relay R840; and in the preceding example, it was assumed that the Strowger mechanism 660 responded to the digit 4 to select the group of trunk lines 230 comprising the first choice route between the RA6 office and the WA2 office and then operated automatically to select the idle trunk line 230 therein. While this is the normal operation of the link 500 in response to the operation of the Strowger mechanism 660 to select the group of trunk lines mentioned, it may occur that all of the trunk lines in the first choice route, including the trunk line 230, are busy; whereby the Strowger mechanism 660 operates in the rotary direction eleven steps to test an idle one of the trunk lines selected. In this case, the set of switch springs S517 is operated completing a circuit, including the contacts 545 and 861, for energizing the upper winding of the busy relay R910 causing the latter relay to operate. Upon operating, the busy relay R910 completes, at the contacts 913, a holding circuit, including the set of switch springs 1SS5, for energizing the lower winding thereof; and interrupts, at the contacts 911, the loop circuit extending between the impulsing conductors 924 and 925 and the windings of the line relay R590 in order to bring about the restoration of the line relay R590 and the consequent restoration of the hold relay R610 shortly thereafter, the latter relay being of the slow-to-release type. Upon restoring, the hold relay R610 completes, at the contacts 613, the previously traced circuit, including the contacts 657 and 594 and the set of switch springs S633, for operating the release magnet M667; whereby the wiper shaft of the Strowger mechanism 660 is released and returned back into its normal rotary and vertical positions opening the sets of switch springs S517, S632 and S633. When the set of switch springs S633 is thus opened, the circuit for energizing the release magnet M667 is interrupted; and when the set of switch springs S517 is thus opened, the circuit for energizing the upper winding of the busy relay R910 is interrupted.

Also upon operating the busy relay R910 interrupts, at the contacts 912, a further point in the path for applying ground potential to the impulsing cam 926; interrupts, at the contacts 914, a further point in the circuit for operating the switch relay R550; and completes, at the contacts 915, an interruptor circuit, including the contacts 1SS4, for operating the rotary magnet 1SS3 of the send sequence switch 1SS; whereby the rotary magnet 1SS3 operates buzzer-fashion to drive the wipers 1SS1 and 1SS2 of the send sequence switch 1SS back into their home positions so that the grounded wiper 1SS1 again engages the home contact terminating the route conductor R and so that the set of switch springs 1SS5 is opened. Also upon operating the busy relay R910 completes, at the contacts 916, a circuit, including the contacts 852, for energizing the upper winding of the route relay R850 in order to cause the latter relay to operate through its first step; and to complete, at the contacts 851′, a substantially identical path, including the contacts 542, for short-circuiting the lower winding thereof, the route relay R850 being of the two-step type.

When the set of switch springs 1SS5 is opened, the holding circuit for energizing the lower winding of the busy relay R910 is interrupted causing the latter relay to restore; whereby there is interrupted, at the contacts 916, the path for short-circuiting the lower winding of the route relay R850 so that a substantially identical circuit, including the contacts 851′ and 542, is completed for energizing in series the lower and upper windings of the route relay R850 so as to cause the latter relay to operate through its second step. When the route relay R850 operates through its second step, it opens the contacts 854, 856 and 858 and closes the contacts 853, 855 and 857, thereby to cancel the first choice selection of routes by the respective recapture relays R840, etc., and to substitute therefor the second choice selection of routes by the respective recapture relays R840, etc. Specifically, in the present example, the route conductor R is now connected via the contacts 843 of the operated recapture relay R840, the contacts 853 of the operated route relay R850 and the contacts 865 of the restored route relay R860 to the eighth marking conductor M8 in the group of marking conductors 890 so as to select the route digit 8 corresponding to a second choice route between the RA6 office and the WA2 office via the SP9 office and including the group of trunk lines 210, as explained more fully below.

Also upon restoring, the busy relay R910 interrupts, at the contacts 915, the interrupter circuit for operating the rotary magnet 1SS3 of the send sequence switch 1SS; reprepares, at the contacts 914, the circuit for operating the switch relay R550; interrupts, at the contacts 913, a further point in the holding circuit for energizing the lower winding thereof; reprepares, at the contacts 912, the path for applying ground potential to the impulsing cam 926; and recompletes, at the contacts 911, the loop circuit for reoperating the line relay R590; whereby the hold relay R610 is reoperated so as to recomplete, at the contacts 616, the path for applying ground potential to the impulsing cam 926. The impulsing cam 926 then operates the rotary magnet DS3 of the digit send switch DS so as to send the presently registered route digit 8 to the line relay R590 so as to bring about reoperation of the Strowger mechanism 660 eight steps in the vertical direction and the consequent selection of the group of trunks, including the trunk 210 extending to the SP9 office. The Strowger mechanism 660 is then operated automatically in the rotary direction to select an idle one of the trunk lines mentioned, whereby the recaptured first office code digit 9 is sent over the selected trunk line, such, for example, as the trunk line 210, by the digit send switch DS; all in the manner previously explained.

Again reconsidering the operation of the link 500, it may occur that all of the trunk lines 210, etc., at this time are busy; whereby the wiper shaft of the Strowger mechanism 660 is again rotated eleven steps in the rotary direction away from its normal rotary position in order again to close the set of switch springs S517 so as to effect reoperation of the busy relay R910 and the consequent release of the Strowger mechanism 660, as well as restoration of the send sequence switch 1SS back into its home position, in the manner previously explained. In this case, the busy relay R910 is operated and subsequently restored so as to bring about the operation of the route relay R860 through its first and second steps, in a manner identical to that explained above in conjunction with the route relay R850, the route relay R860 also being of the two-step type. When the route relay R860 is operated through its second step, it interrupts, at its contacts 865, 867 and 869, the second choice routes established by the respective recapture relays R840, etc., in conjunction with the operated route relay R850, and reestablishes, at the contacts 864, 866 and 868, the first choice routes established by the respective recapture relays R840, etc., and the operated route relay R850. More particularly, at this time, the route conductor R is connected, via the contacts 843 of the operated recapture relay R840, the contacts 853 of the operated route relay R850 and the contacts 864 of the operated route relay R860, to the fourth marking conductor M4 in the marking group 890. Thus at this time the restored busy relay R910 and the reoperated hold relay R610 bring about reoperation of the digit send switch DS again to send the route digit 4. Accordingly, the Strowger mechanism 660 again operates to select the group of trunks 230 comprising the first choice route between the RA6 office and the WA2 office and operates again automatically to test the selected group of trunk lines for an idle trunk line therein.

Now in the event that all of the trunk lines in the group including the trunk line 230, constituting the first choice route between the RA6 office and the WA2 office should again test as busy, the Strowger mechanism 660 would again be operated into its eleventh rotary position in order again to close the set of switch springs S517. In this case, closure of the set of switch springs S517 completes a circuit for returning busy tone over the calling loop circuit by virtue of the circumstance that the route relay R860 occupies its operated position, interrupting, at the contacts 861, the normal connection to the upper winding of the busy relay R910; and completing, at the contacts 862, a connection via the condenser 862' to the — line conductor 511. The circuit mentioned also includes the contacts 545 and the grounded secondary winding of the busy transformer 596, whereby busy tone is returned over the calling subscriber line 7930 to the calling subscriber substation T1. Upon receiving the busy tone, the subscriber, at the calling subscriber substation T1 disconnects bringing about the release of the link 500 and the consequent production of a record therein upon the medium 701 by the magnetic recorder 700; all in the manner previously explained. In this case, there will be no time item upon the medium 701 since the established connection was not completed; and moreover there may be no digits registered in the office registers O2 and O3 and the numerical registers N1, N2, N3 and N4, since the busy tone may be received by the subscriber at the calling subscriber substation T1, as described above, before he has an opportunity to dial any digit beyond the first office code digit 9. On the other hand, the second called office code digit 2, etc., may be registered in the office resistor O2, etc., whereby any of the digits that are registered in the various registers O2, etc., are recorded upon the medium 701. The recording of an incomplete called office code and called line digits upon the medium 701 clearly indicates that the call was abandoned before all of the digits were dialed by the subscriber at the calling subscriber substation T1. However this circumstance is of no consequence as the lack of a record of a time item upon the medium 701 clearly indicates that the call was never completed.

*Section 6.—Attempted call from a second class subscriber substation in the RA6 office to a subscriber substation in the WA2 office*

In order to convert any subscriber line, such, for example, as the subscriber line 7930 in the RA6 office from the first-class to the second-class, it is only necessary to insert the plug 356 terminating the gaseous discharge tube 357 into the associated jack 355 in the line circuit 300; whereby the subscriber line 7930 may no longer extend suburban toll calls via the links 500, etc., to the other WA2, etc., offices. Now assuming that the plug 356 has been inserted into the jack 355 in the line circuit 300 converting the subscriber line 7930 to the second-class and that the subscriber at the calling subscriber substation T1 in the RA6 office attempts a call to the WA2 office. In this case, the call is initiated at the calling subscriber substation T1, whereby the line circuit 300 is controlled so that the finder 360 and the first selector 410 may be taken into use. The subscriber at the subscriber substation T1 dials the first office code digit 9, whereby the first selector 410 may select the trunk 510 extending to the link 500 in order to bring about seizure thereof in the manner explained in Section 5. Particularly the link 500 effects the recapture of the first office code digit 9 and operation of the Strowger mechanism 660 in accordance with the route digit 4 so as to select an idle one of the trunk lines, such, for example, as the trunk line 230, and then sends thereover the recapture first office code digit 9. Also the link 500 begins to accept the second, etc., called office code digits 2, etc., that are dialed at the calling subscriber substation T1; however incident to seizure of the link 500, operation of the allotter 520 is initiated so that when the finder 521 in the allotter 520 selects the conductor 528 extending to the link 500, the identity relay R570 is operated bringing about the indentification of the calling subscriber line 7930 and the registration of the identity thereof in the registers 1001, 1002, 1003 and 1004; all in the manner previously explained.

However, the application of the booster battery potential to the control conductor 353 of the subscriber line 7930 brings about conduction by the gaseous discharge tube 357 via a circuit including the contacts 313, the upper winding of the lockout relay R330 and the control conductor 353, as well as the plug 356 and the jack 355. Accordingly, the upper winding of the lockout relay R330 is energized causing the latter relay to operate shortly thereafter, it being of the slow-to-operate type, sufficiently to close the contacts 335, so as to complete a holding circuit for energizing the lower winding thereof. The lockout relay R330 then operates completely to interrupt, at the contacts 336, the holding circuit for retaining operated the cutoff relay R310; to interrupt, at the contacts 338, a further point in the path for applying ground potential to the start conductor 340; to interrupt, at the contacts 331 and 332 the loop circuit between the calling subscriber substation T1 and the line relay R530 in the link 500; and to prepare, at the contacts 334, a connection, including the secondary winding 344 of the lockout tone transformer 342, for connecting the upper winding of the line relay R320 to the line conductor 351 of the subscriber line 7930. Upon restoring, the cutoff relay R310 completes, at the contacts 311 and 312, the connection mentioned; whereby the upper and lower windings of the line relay R320 are energized over the loop circuit extending to the calling subscriber substation T1 so as to cause reoperation of the line relay R320; whereby the lockout tone mentioned is returned to the calling subscriber substation T1 in order to indicate to the subscriber thereat that the subscriber line 7930 is now locked out of service. Also the line relay R320 completes, at the contacts 322, a holding circuit, including the contacts 337 and 335, for energizing the lower winding of the lockout relay. Also, at this time, the operated line relay R320 completes, at the contacts 323, a path for applying ground potential to the control conductor 354 of the subscriber line 7930, so as to retain the busy marking thereof to the connectors in the local switch train having access thereto. Further, the operated lockout relay R330 retains interrupted, at the contacts 338, the normal path for applying ground potential to the start conductor 340 extending to the distributor 341 so that the subscriber line 7930 is retained locked out of service until the subscriber thereat subsequently disconnects.

Finally, the operated lockout relay R330 interrupts, at the contacts 331 and 332, the loop circuit extending to the line relay R530 in the link 500, as previously noted, thereby to cause the latter relay to restore so as to effect the restoration of the hold relay R540 shortly thereafter, the latter relay being of the slow-to-release type. Upon restoring, the hold relay R540 brings about the restoration of the line relay R590 and the consequent operation of the release magnet M667 so that the Strowger mechanism 660 and the succeeding elements of the switching apparatus are released, all in the manner previously explained. At this time, the switch relay R550 occupies its restored position since a full complement of three called office code digits and four called numerical line digits were not received by the link 500 and consequently were not sent by the send sequence switch 1SS. Accordingly, after the calling subscriber line 7930 has been identified effecting operation of the register relay R560 as a consequence of the registration of the thousand digit 7 in the T register 1001, there is completed an alternative circuit, including the contacts 657, 594, 613, 562, 558 and 546, for energizing the lower winding of the record relay R580 so as to cause the latter relay to operate. Upon operating, the record relay R580 completes, at the contacts 583 and 582, the previously traced holding circuit, including the grounded release conductor 1017, for energizing the upper winding thereof; and completes, at the contacts 581, the previously traced path, including the contacts 573, for returning ground potential upon the conductor 595 so as to retain the recapture relay R840 in its operated position and the link 500 marked as busy via the trunk 510 to the first selectors 410, etc., having access thereto.

Also upon operating, the record relay R580 brings about the operation of the magnetic recorder 700, and effects operation of the record sequence switch RSS; all in the manner previously explained in Section 5. At the conclusion of the operation of the record sequence switch RSS, the release relay R1015 is operated so as to bring about the complete release of the link 500 in the manner explained in Section 5. In the present example, it is noted that the record that is made by the magnetic recorder 700 includes the calling office code RA6, as well as the identification of the calling line 7930 extending to the calling subscriber substation T1, at which the call was initiated that brought about the forced release above described; however, the record is incomplete, as previously noted, but includes the identification of the calling subscriber line 7930 clearly indicating the forced release of the link 500 as described above. The production of the partial record incident to the attempted extension of a suburban toll call from the calling subscriber line 7930 of the second-class is useful to the telephone company in its sales promotional work as it is apparent that the normal service rate for suburban lines of the second-class is less than that for subscriber lines of the first-class.

Also in passing, it is pointed out that the release of the link 500 is substantially identical to that described immediately above in the event the subscriber at the calling subscriber substation T1 should initiate a call, dial one or more of the digits of a called office code, including the first digit 3, 5 or 9, and then abandon the call; whereby incident to the release of the link 500, a partial record is made as explained above. In other words, the above described release takes place by virtue of the failure of the link 500 to receive the full complement of three called office code digits and four called numerical line digits, whereby the send sequence switch 1SS is not operated into its eighth position to effect operation of the switch relay R550 in the usual and normal manner.

At this point, it is noted that the forced release of a call involving a second class subscriber substation in the RA6 office and routed via one of the two-digit recapture links 1100 or routed via one of the three-digit recapture links 1200, etc., is essentially the same as that described above, and is not further described in detail in the interest of brevity.

*Section 7.—A call from a first class subscriber substation in the RA6 office to a subscriber substation in the YU5 office*

The extension of a call from a calling subscriber substation of the first class, such, for example, as the subscriber substation T1, in the RA6 office to a called subscriber substation in the YU5 office is substantially the same as that described in Sect. 5. For example, the subscriber at the calling subscriber substation T1 may initiate the call and dial the digits 985–1234, bringing about the routing of the connection via the finder 360 and the first selector 410 to the one-digit recapture link 500; whereby the recapture relay R840 is operated to recapture the first office code digit 9, and the second and third office code digits 8 and 5 are registered in the office register O2 and O3, and the four numerical digits 1, etc., are registered in the four numerical registers N1, etc.; the subsequent operation and release of the apparatus are substantially the same as that described in Sect. 5.

*Section 8.—A call from a first class subscriber substation in the RA6 office to a subscriber substation in the LI8 office*

The extension of a call from a calling subscriber substation of the first class, such, for example, as the subscriber substation T1, in the RA6 office to a called subscriber substation in the LI8 office is substantially the same as that described in Sect. 5. For example, the subscriber at the calling subscriber substation T1 may initiate the call and dial the digits 548–1234 bringing about the routing of the connection via the finder 360 and the first selector 410 to the one-digit recapture link 500; whereby the recapture relay R835 is operated to recapture the first office code digit 5, and the second and third office code digits 4 and 8 are registered in the office register O2 and O3, and the four numerical digits 1, etc., are registered in the four numerical registers N1, etc.; the subsequent operation and release of the apparatus are substantially the same as that described in Sect. 5.

*Section 9.—A call from a first class subscriber substation in the RA6 office to a subscriber substation in the MA3 office*

The extension of a call from a calling subscriber substation of the first class, such, for example, as the subscriber substation T1, in the RA6 office to a called subscriber substation in the MA3 office is similar to that described in Sect. 5, but one of the two-digit recapture links 1100, etc., is employed. For example, the subscriber at the calling subscriber substation T1 may initiate the call and dial the digits 623–1234 bringing about the routing of the connection via the finder 360 and the first selector 410 to one of the second selectors 411, etc., and then to one of the two-digit recapture links 1100, etc. Specifically, the first selector 410 may respond to the first office code digit 6 to select the second selector 411, and the second selector 411 may respond to the second office code digit 2 to select the trunk 1110 extending to the toll recording link of the two-digit recapture type 1100 bringing about the operation of the recapture relay R1130. Upon operating, the recapture relay R1130 brings about operation of the lockout relay R1120 so as to mark the trunk 1110 as busy to the other second selectors having access thereto. Also the recapture relay R1130 completes, at its contacts 1133, a marking path between the R conductor and the sixth marking conductor in the associated marking group 1190, thereby establishing the routing digit 6. Further, the recapture relay R1130 completes, at its contacts 1131 and 1132, paths between the conductors 1C and 2C and the respective sixth and second marking conductors in the associated marking group 1190, thereby to effect the recapture of the first and second office code digits 6 and 2, respectively. The third office code digit 3 and the numerical digits 1, etc., are received over the line conductors 1111 and 1112 of the trunk 1110 and bring about the operation of the line relay, not shown, so as to effect the registration of these digits in the corresponding office register and numerical registers, not shown. The registration of the third office code digit 3 and the numerical digits 1, etc., is governed by the register sequence switch 2RS in a manner identical to that of the register sequence switch 1RS in the link 500 described in Sect. 5; and the subsequent operation of the link 1100 to send the route digit 6 followed by the three office code digits 6, 2 and 3 and the four numerical digits 1, 2, 3 and 4 under the control of the send sequence switch 2SS so as to bring about the ultimate completion of the established connection is substantially identical to that of the corresponding elements in the link 500, described in detail in Sect. 5. Also the subsequent release of the link 1100 is identical to that of the link 500 described in Sect. 5.

*Section 10.—A call from a first class subscriber substation in the RA6 office to a subscriber substation in the SP9 office*

An extension of a call from a calling subscriber substation of the first class, such, for example, as the subscriber substation T1, in the RA6 office to a called subscriber substation in the SP9 office is similar to that described in Section 5, but one of the two-digit recapture links 1100, etc., is employed. For example, the subscriber at the calling subscriber substation T1 may initiate the call and dial the digits 779–1234 bringing about the routing of the connection via the finder 360 and the first selector 410 to one of the second selectors 413, etc., and then to one of the two-digit recapture links 1100, etc. Specifically, the first selector 410 may respond to the first office code digit 7 to select the second selector 413, and the second selector 413 may respond to the second office code digit 7 to select the trunk 1110 extending to the toll recording link of the two-digit recapture type 1100 bringing about the operation of the recapture relay R1140. Upon operating, the recapture relay R1140 brings about operation of the lockout relay R1120 so as to mark the trunk 1110 as busy to the other second selectors having access thereto. Also the recapture relay R1140 completes, at its contacts 1143, a marking path between the R conductor and the eighth marking conductor in the associated marking group 1190, thereby establishing the routing digit 8. Further, the recapture relay R1140 completes, at its contacts 1141 and 1142, paths between the conductors 1C and 2C and the respective seventh and seventh marking conductors in the associated marking group 1190, thereby to effect the recapture of the first and second office code digits 7 and 7, respectively. The third office code digit 9 and the numerical digits 1, etc., are received over the line conductors 1111 and 1112 of the trunk 1110 and bring about operation of the line relay, not shown, so as to effect the registration of these digits in the corresponding office register and the numerical registers, not shown. The registration of the third office code digit 9 and the numerical digits 1, etc., is governed by the register sequence switch 2RS, in a manner identical to that of the register sequence switch 1RS in the link 500, described in Section 5; and the subsequent operation of the link 1100 to send the routing digit 8 followed by the three office code digits 7, 7 and 9 and the four numerical digits 1, 2, 3 and 4 under the control of the send sequence switch 2SS so as to bring about the ultimate completion of the established connection is substantially identical to that of the corresponding elements in the link 500, described in detail in Section 5. Also the subsequent release of the link 1100 is identical to that of the link 500, described in Section 5.

*Section 11.—A call from a first class subscriber substation in the RA6 office to a subscriber substation in the MO6 office*

The extension of a call from a calling subscriber substation of the first class, such, for example, as the subscriber substation T1, in the RA6 office to a called subscriber substation in the MO6 office is similar to that described in Section 5, but one of the two-digit recapture links 1100, etc., is employed. For example, the subscriber at the calling subscriber substation T1 may initiate the call and dial the digits 666–1234 bringing about the routing of the connection via the finder 360 and the first selector 410 to one of the second selectors 411, etc., and then to one of the two-digit recapture links 1100, etc. Specifically, the first selector 410 may respond to the first office code digit 6 to select the second selector 411, and the second selectors 411 may respond to the second office code digit 6 to select the trunk 1110 extending to the toll recording link of the two-digit recapture type 1100 bringing about the operation of the recapture relay R1135. Upon operating, the recapture relay R1135 brings about operation of the lock-out relay R1120 so as to mark the trunk 1110 as busy to the other second selectors having access thereto. Also the recapture relay R1135 completes, at its contacts 1138, a marking path between the R conductor and the eighth marking conductor in the associated marking group 1190, thereby establishing the routing digit 8. Further, the recapture relay R1135 completes at its contacts 1136 and 1137 paths between the conductors 1C and 2C and the respective sixth and sixth marking conductors in the associated marking group 1190, thereby to effect the recapture of the first and second office code digits 6 and 6, respectively. The third office code digit 6 and the numerical digits 1, etc., are received over the line conductors 1111 and 1112 of the trunk 1110 and bring about operation of the line relay, not shown, so as to effect the registration of these digits in the corresponding office register and the numerical registers, not shown. The registration of the third office code digit 6 and the numerical digits 1, etc., is governed by the register sequence switch 2RS in a manner identical to that of the register sequence switch 1RS in the link 500 described in Section 5; and the subsequent operation of the link 1100 to send the routing digit 8 followed by the three office code digits 6, 6 and 6 and the four numercial digits 1, 2, 3 and 4 under the control of the send sequence switch 2SS so as to bring about the ultimate completion of the established connection is substantially identical to that of the corresponding elements in the link 500, described in detail in Section 5. Also the subsequent release of the link 1100 is identical to that of link 500, described in Section 5.

*Section 12.—A call from a first class subscriber substation in the RA6 office to a subscriber substation in the RA3 office*

The extension of a call from a calling subscriber substation of the first class, such, for example, as the subscriber substation T1, in the RA6 office to a called subscriber substation in the RA3 office is similar to that described in Section 5, but one of the three-digit recapture links 1200, etc., is employed. For example, the subscriber at the calling subscriber substation T1 may initiate the call and dial the digits 723–1234 bringing about the routing of the connection via the finder 360 and the first selector 410 to one of the second selectors 413, etc., to one of the third selectors 415, etc., and then to one of the three-digit recapture links 1200, etc. Specifically, the first selector 410 may respond to the first office code digit 7 to select the second selector 413, the second selector 413 may respond to the second office code digit 2 to select the third selector 415, and the third selector 415 may respond to the third office code digit 3 to select the trunk 1210 extending to the toll recording link of the three-digit recapture type 1200 bringing about the operation of the recapture relay R1235. Upon operating the recapture relay R1235 brings about operation of the lockout relay R1220 so as to mark the trunk 1210 as busy to the other third selectors having access thereto. Also the recapture relay R1235 completes, at its contacts 1236, a marking path between the R conductor and the second marking conductor in the associated marking group 1290, thereby establishing the routing digit 2. Further, the recapture relay R1235 completes, at its contacts 1237, 1238 and 1239, paths between the conductors 1C, 2C and 3C and the respective seventh, second and third marking conductors in the associated marking group 1290, thereby to effect the recapture of the first and second and third office code digits 7, 2 and 3, respectively. The numerical digits 1, etc., are received over the line conductors 1211 and 1212 of the trunk 1210 and bring about operation of the line relay, not shown, so as to effect the registration of these digits in the corresponding numerical registers, not shown. The registration of the numercial digits 1, etc., is governed by the register sequence switch 3RS in a manner identical to that of the register sequence switch 1RS in the link 500, described in Section 5; and the subsequent operation of the link 1200 to send the routing digit 2 followed by the three office code digits 7, 2 and 3 and the four numercial digits 1, 2, 3 and 4 under the control of the send sequence switch 3SS so as to bring about the ultimate completion of the established connection is substantially identical to that of the corresponding elements in the link 500, described in detail in Section 5. Also, the subsequent release of the link 1200 is identical to that of link 500, described in Section 5.

*Section 13.—The fundamental method of the telephone system*

From the foregoing description of the routing of connections from the calling RA6 office to the called WA2, YU5, LI8, MA3, SP9, MO6 and RA3 offices described in Sections 5 to 12, inclusive, it will be understood that the first office code digit may be adequate to identify the route to the called office (the called offices WA2, YU5 and LI8), whereby the automatic switching apparatus in the RA6 office accepts the first office code digit to select one of the one-digit recapture links 500, etc., whereby the link 500 immediately establishes the proper routing digit and transmits the established routing digit and the recaptured first office code digit therefrom so as to effect operation of the terminating automatic switch with the established routing digit and transmission of the recaptured first office code digit over the trunk line that has been selected and that extends toward the called office.

However, the first office code digit may be inadequate to identify the route to the called office, but this circumstance may be established by the combination of the first and second called office codes (the called offices MA3, SP9 and MO6), whereby the automatic switching apparatus in the RA6 office accepts the first and second office code digits to select one of the two-digit recapture links 1100, etc., whereby the link 1100 immediately establishes the proper routing digit and transmits the established routing digit and the recaptured first and second office code digits therefrom so as to effect operation of the terminating automatic switch with the established routing digit and the transmission of the recaptured first and second office code digits over the trunk line that has been selected and that extends toward the called office.

However, the combination of the first and second office code digits may be inadequate to identify the route to the called office, but this circumstance in established by the combination of the first, second and third called office codes (the called office RA3), whereby the automatic switching apparatus in the RA6 office accepts the first, second and third called office code digits to select one of the three-digit recapture links 1200, etc., whereby the link 1200 immediately establishes the proper routing digit and transmits the established routing digit and the recaptured first, second and third office code digits therefrom so as to effect operation of the terminating automatic switch with the established routing digit and the transmission of the recaptured first, second and third office code digits over the trunk line that has been selected and that extends toward the called office.

Thus in accordance with the method, one or more of the office code digits are employed in the automatic switching apparatus in the RA6 office and until the route to the called office can be established from the one or more called office code digits received, whereby the extension of the connection from the calling RA6 office proceeds therefrom as quickly as possible; and in the cases of one-digit recapture and two-digit recapture proceed therefrom entirely to the called office, or at least to a tandem office in route to the called office, prior to the dialing of the complete called office code of three digits. In the cases of two-digit recapture and one-digit recapture, the office code digit and digits dialed, subsequent to the operation of the switching apparatus to seize the appropriate link, are registered in the seized link and repeated, as received, therefrom over the extended connection. Finally, in any case, the numerical digits that are dialed over the calling line are registered in the seized link and repeated, as received, therefrom over the extended connection. Thus ultimately in any case the switching apparatus in the calling RA6 office operates to seize an appropriate one of the links and to cause the three office code digits and the four numerical digits to be registered in the seized link; while the seized link causes the connection to be extended either to the called office or to a tandem office in route thereto, and causes the three office code digits and the four numerical digits to be transmitted over the connection. This arrangement permits the switching apparatus in the called office, or in the tandem office in route to the called office, to take over the further extension of the connection on to the called subscriber line in the called office in a straightforward and rapid manner.

Of course, it will be understood that partial or complete records are produced in the calling office in conjunction with each interoffice call involving one of the recapture links; whereby from the records thus produced, the ultimate charges, where required, may be selectively established by centralized billing equipment.

Moreover it will be understood that local calls in the RA6 office are completed entirely independently of the toll recording links 500, etc.

*Section 14.—A call through the RA6 office*

In the setting-up of certain connections, calls are routed through the RA6 office in tandem relation, such, for example, in the setting-up of a connection from the RA3 office to the WA2 office. In this case, the automatic switching apparatus in the RA3 office may extend the connection over the trunk line 240 so as to cause the terminating trunk circuit 241 in the RA6 office to bring about operation of the associated line switch 244 to select an idle one of the incoming links, such, for example, as the incoming link 250 that is terminated by the trunk selector 251 and provided with the finder 252. When the connection is thus extended over the trunk line 240 to the incoming link 250, the finder 252 operates to select an idle one of the register translators, such, for example, as the register translator 253. The apparatus in the RA3 office then transmits the called office code 922 followed by the numerical digits 1, 2, 3 and 4 over the trunk line 240, bringing about the registration thereof in the register translator 253. In response to the registration of the called office code 922 in the register translator 253, the register translator 253 establishes a proper routing digit 4 and transmits the routing digit 4 to the trunk selector 251 so as to bring about operation thereof to select an idle one of the trunk circuits, such, for example, as the trunk circuit 231 terminating the trunk line 230, extending from the RA6 office to the WA2 office. The register translator 253 then transmits the digits 922–1234 over the trunk line 230, whereby the digits mentioned are registered in a register translator in the called WA2 office so as to bring about the ultimate completion of the connection. The register translator 253 in the RA6 office is then released; and at the conclusion of the established connection, the apparatus in the RA6 office, including the trunk circuits 241 and 231, the incoming link 250, and the trunk selector 251 are released in the manner disclosed in the previously-mentioned Baird and Bielenberg application.

Of course, the completed connection from the RA3 office to the WA2 office routed via the RA6 office in tandem relation is controlled primarily from the calling RA3 office and the items of record information in conjunction therewith are accumulated and recorded in the RA3 office, in the manner previously explained.

*Section 15.—A call to the RA6 Office*

Considering now the setting up of a connection between a calling first class subscriber substation in the RA3 office and a called subscriber substantion in the RA6 office, the call is initiated by the subscriber at the calling subscriber substation in the RA3 office and the switching apparatus therein extends the call over an idle one of the trunk lines, such, for example, as the trunk line 240 terminated by the trunk circuit 241 in the RA6 office, whereby the line switch 244 may select the incoming link 250 and the finder 252 may select the register translator 253. In this case, the call may be extended to the subscriber substation T1 terminated by the subscriber line 7930, whereby the digits 726–7930 transmitted over the trunk line 240 are registered in the register translator 253. In this connection, the register translator 253 recognizes the local called office code 726 and establishes two appropriate routing digits 0 and 6 therefrom. The register translator 253 then transmits the two established routing digits 0 and 6 followed by the registered numerical digits 7930. The trunk selector 251 responds to the first routing digit 0 and may select the trunk 202 extending to the office selector 201; and the office selector 201 responds to the second digit 6 and may select the trunk 418 extending to the fourth selector 417. The fourth selector 417 may respond to the digit 7 to select the trunk 420 extending to the fifth selector 419; the fifth selector 419 may respond to the numerical digit 9 to select the trunk 422 extending to the connector 421; and the connector 421 responds to the numerical digits 3 and 0 to select the subscriber line 7930 extending to the called subscribed substation T1. At this time, the register translator 253 is released, and the subsequent operation of the connector 421 depends upon the idle or busy condition of the called subscriber substation T1 at this time. Assuming that the called subscriber substation T1 is idle at this time, the connector 421 operates to project ringing current over the subscriber line 7930 and to return ring-back tone current over the connection including the trunk line 240. Thereafter when the call is answered at the called subscriber substation T1 in the RA6 office, the connector 421 operates to arrest the projection of ringing current over the subscriber line 7930, to arrest the return of ring-back tone current over the connection, including the trunk line 240, and to reverse the polarity of the connection over the trunk line 240 so as to govern the apparatus in the calling RA3 office for the recording purpose previously explained. The control of the established connection is primarily from the calling RA3 office; and at the conclusion thereof, all of the apparatus in the RA6 office, including the trunk circuit 241, the incoming link 250, the trunk selector 251, the office selector 201, the fourth selector 417, the fifth selector 419 and the connector 421, is released and rendered available for further use.

*Section 16.—The modification in the line circuits and in the toll recording links*

As previously noted, the line circuits 300, etc., and the toll recording links 500, etc., may be modified as shown in Fig. 14 in order to substitute a decimal marking system for the WXYZ marking system illustrated. Referring now to Fig. 14, it is contemplated the control conductor 353 of the subscriber line 7930 extending into the line circuit 300A will be connected to four individual gaseous discharge tubes 371′, 372′, 373′, and 374′, respectively, received, in four sockets or fixtures and respectively arranged in the four groups of marking conductors T370′, H370′, D370′ and U370′ in the marking cable 370′ extending between the line circuit 300A and the gang relay R710′ in the toll recording link 500A. In this arrangement, four groups of ten marking conductors each are provided in the marking cable 370′, instead of the four groups of four marking conductors each that are provided in the marking cable 370. While the arrangement employs a total of forty marking conductors in the marking cable 370′, instead of sixteen marking conductors each in the marking cable 370, an economy is effected in the total number of gaseous discharge tubes that are required in the line circuits, 300A, etc. More particularly, in a 10,000 line office, a total of 40,000 gaseous discharge tubes are required employing this modified decimal marking system, whereas in the equivalent WXYZ marking system, a total of 64,000 gaseous discharge tubes would be required.

Of course, it will be understood that in employing this modified decimal marking system, each of the toll recording links 500A, etc., comprise a T register 1001′, an H register 1002′, a D register 1003′ and a U register 1004′, each provided with ten individual register relays, instead of four individual register relays as required in the WXYZ marking system.

The general principle of operation of the link 500A employing the modified form of the digit marking system of Fig. 14 is substantially identical to that previously described, whereby the four digits 7, 9, 3 and 0 corresponding to the directory number of the calling subscriber line 7930 terminated by the line circuit 300A are transferred via the marking cables 370′ and 740′ to the corresponding registers 1001′, 1002′, 1003′ and 1004′ in the toll recording link 500A; and the operation of the link 500A is otherwise the same as that previously described.

*Section 17.—The modification in the trunking plan*

As previously noted, the trunking plan of the toll recording links in the RA6 office, as illustrated in Fig. 2, may be modified in certain particulars, as illustrated in Fig. 15. Specifically, as illustrated in Fig. 15, the group of one-digit recapture links is arranged in three individual subgroups that are provided with a common overflow link 500, the three subgroups respectively including the links 500A, 500B and 500C. In the arrangement, it is contemplated that the subgroup of links 500A, etc., will be simplified so that they are capable of recapturing only the single digit 9; the subgroup of links 500B, etc., will be simplified so that they are capable of recapturing only the single digit 5; the subgroup of links 500C, etc., will be simplified so that they are capable of recapturing only the single digit 3; while the link 500 will be identical to the link 500, shown in Figs. 5 to 10, inclusive, and capable of recapturing any one of the single digits 9, 5 and 3

Likewise the group of two-digit recapture links is arranged in three individual subgroups that are provided with a common overflow link 1100; the three subgroups respectively including the links 1100A, 1100B, and 1100C. In the arrangement, it is contemplated that the subgroup of links 1100A, etc., will be simplified so that they are capable of recapturing only the single two-digit combination 66; the subgroup of links 1100B, etc., will be simplified so that they are capable of recapturing only the single two-digit combination 62; the subgroup of links 1100C, etc., will be simplified so that they are capable of recapturing only the two-digit combination 77; while the link 1100 will be identical to the link 1100, shown in Fig. 11, and capable of recapturing any one of the two-digit combinations 66, 62 and 77.

Finally, the group of three-digit recapture links is arranged in three individual subgroups that are provided with a common overflow link 1200, the three subgroups respectively including the links 1200A, 1200B, and 1200C. In the arrangement, it is contemplated that the subgroup of links 1100A, etc., will be simplified so that they are capable of recapturing only the single three-digit combination 721; the subgroup of links 1200B, etc., will be simplified so that they are capable of recapturing only the single three-digit combination 723; the subgroup of links 1200C, etc., will be simplified so that they are capable of recapturing only the three-digit combination 727; while the link 1200 will be identical to the link 1200, shown in Fig. 12, and capable of recapturing any one of the three-digit combinations 721, 723 and 727.

The operations of the links 500A, etc., 1100A, etc., and 1200A, etc., are otherwise the same as the respective links 500, 1100 and 1200, previously described.

*Section 18.—Conclusions*

In view of the foregoing, it is apparent that there has been provided improved apparatus for setting-up suburban toll calls, without the assistance of operators, in a simple and straightforward manner so that toll recording links incorporating register and sender and recorder equipment are employed only in conjunction with these suburban toll calls mentioned.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a calling line, a first link, a second link, a third link, automatic switching apparatus having access to said links, means for connecting said calling line to said switching apparatus, said switching apparatus being selectively operated in response to the dialing over said calling line of certain first office code digits to seize said first link and selectively operated in response to the dialing over said calling line of certain combinations of first and second office code digits to seize said second link and selectively operated in response to the dialing over said calling line of certain combinations of first and second and third office code digits to seize said third link, means included in said first link and responsive to the seizure thereof by said switching apparatus for immediately recapturing and registering therein the particular first office code digit employed in the operation of said switching apparatus to seize said first link, means included in said second link and responsive to the seizure thereof by said switching apparatus for immediately recapturing and registering therein the particular combination of first and second office code digits employed in the operation of said switching apparatus to seize said second link, means included in said third link and responsive to the seizure thereof by said switching apparatus for immediately recapturing and registering therein the particular combination of first and second and third office code digits employed in the operation of said switching apparatus to seize said third link, means included in said first link for registering therein second and third office code digits and a given number of numerical digits dialed over said calling line subsequent to the operation of said switching apparatus, means included in said second link for registering therein a third office code digit and a given number of numerical digits dialed over said calling line subsequent to the operation of said switching apparatus, means included in said third link for registering therein a given number of numerical digits dialed over said calling line subsequent to the operation of said switching apparatus, a plurality of trunks, and means included in each one of said links and responsive to the registration therein of one or more recaptured office code digits for immediately completing a connection therefrom to an idle one of said trunks and then for immediately repeating over said one trunk the one or more recaptured office code digits registered therein.

2. In a telephone system, a calling line, a first link, a second link, a third link, means for connecting said calling line to any one of said links, means included in said first link and responsive to the connection of said calling line thereto for automatically registering therein a given first office code digit, means included in said second link and responsive to the connection of said calling line thereto for automatically registering therein a given combination of first and second office code digits, means included in said third link and responsive to the connection of said calling line thereto for automatically registering therein a given combination of first and second and third office code digits, means included in each one of said links for registering therein other digits dialed over said calling line subsequent to the connection of said calling line to said one link, a plurality of trunks, and means included in each one of said links and responsive to the registration therein of one or more recaptured office code digits for immediately completing a connection therefrom to an idle one of said trunks and then for immediately repeating over said one trunk the one or more recaptured office code digits registered therein.

3. In a telephone system, a calling line, a first line, a second link, a third link, automatic switching apparatus having access to said links, means for connecting said calling line to said switching apparatus, said switching apparatus being operated in response to the dialing over said calling line of a first given first office code digit to seize either said first link or said third link and operated in response to the dialing over said calling line of a second given first office code digit to seize either said second link or said third link, means included in said first link and responsive to the seizure thereof by said switching apparatus for automatically registering therein said first given first office code digit employed in the operation of said switching apparatus, means included in said second link and responsive to seizure thereof by said switching apparatus for automatically registering therein said second given first office code digit employed in the operation of said switching apparatus, means included in said third link and responsive to the seizure thereof by said switching apparatus for recapturing and registering therein the particular one of said first or second given first office code digits employed in the operation of said switching apparatus, and means included in each of said links for registering therein second and third office code digits and a given number of numerical digits dialed over said calling line subsequent to the operation of said switching apparatus, said third link being arranged in overflow relation with said first and second links so that said third link is seized instead of said first link only when said first link is busy and said third link is seized instead of said second link only when said second link is busy.

4. In a telephone system, a calling line, a first link, a second link, a third link, automatic switching apparatus having access to said links, means for connecting said calling line to said switching apparatus, said switching apparatus being operated in response to the dialing over said calling line of a first combination of first and second office code digits to seize either said first link or said third link and operated in response to the dialing over said calling line of a second combination of first and second office code digits to seize either said second link or said third link, means included in said first link and responsive to the seizure thereof by said switching apparatus for automatically registering therein said first combination of first and second office code digits employed in the operation of said switching apparatus to seize said first link, means included in said second link and responsive to seizure thereof by said switching apparatus for automatically registering therein said second combination of first and second office code digits employed in the operation of said switching apparatus to seize said second link, means included in said third link and responsive to the seizure thereof by said switching apparatus for immediately recapturing and registering therein the particular one of said first or second combinations of first and second office code digits employed in the operation of said switching apparatus to seize said third link, means included in each one of said links for registering therein a third office code digit and a given number of numerical digits dialed over said calling line subsequent to the operation of said switching apparatus to seize said one link, a plurality of trunks, and means included in each one of said links and responsive to the registration therein of one or more recaptured office code digits for immediately completing a connection therefrom to an idle one of said trunks and then for immediately repeating over said one trunk the one or more recaptured office code digits registered therein.

5. In a telephone system, a calling line, a first link, a second link, a third link, automatic switching apparatus having access to said links, means for connecting said calling line to said switching apparatus, said switching apparatus being operated in response to the dialing over said calling of a first combination of first and second and third office code digits to seize either said first link or said third link and operated in response to the dialing over said calling line of a second combination of first and second and third office code digits to seize either said second link or said third link, means included in said first link and responsive to the seizure thereof by said switching apparatus for automatically registering therein said first combination of first and second and third office code digits employed in the operation of said switching apparatus to seize said first link, means included in said second link and responsive to seizure thereof by said switching apparatus for automatically registering therein said second combination of first and second and third office code digits employed in the operation of said switching apparatus to seize said second link, means included in said third link and responsive to the seizure thereof by said switching apparatus for immediately recapturing and registering therein the particular one of said first or second combinations of first and second and third office code digits employed in the operation of said switching apparatus to seize said third link, means included in each one of said links for registering therein a given number of numerical digits dialed over said calling line subsequent to the operation of said switching apparatus to seize said one link, a plurality of trunks, and means included in each one of said links and responsive to the registration therein of one or more recaptured office code digits for immediately completing a connection therefrom to an idle one of said trunks and then for immediately repeating over said one trunk the one or more recaptured office code digits registered therein.

6. In a telephone system, a calling line, automatic switching apparatus, a plurality of links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering therein the particular combinations of digits employed in the operation of said switching apparatus to seize said one link, and means included in said one link and selectively responsive to the registration therein of the different combinations of recaptured digits for immediately selectively completing connections from said one link to the different ones of said trunks and then for repeating over said one trunk the particular combination of recaptured digits registered in said one link.

7. In a telephone system, a calling line, automatic switching apparatus, a plurality of links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering therein the particular combination of digits employed in the operation of said switching apparatus to seize said one link, means included in said one link and selectively responsive to the registration therein of the different combinations of recaptured digits for immediately selectively completing connections from said one link to the different ones of said trunks and then for immediately repeating over said one trunk the particular combination of recaptured digits registered in said one link, and additional means included in said one link for registering therein other digits dialed over said calling line subsequent to the operation of said switching apparatus to seize said one link and then for repeating over said one trunk the other digits registered in said one link.

8. In a telephone system, a calling line, automatic switching apparatus, a plurality of links, a plurality of automatic switches respectively terminating said links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering in said one link the particular combination of digits employed in the operation of said switching apparatus to seize said one link, means included in said one link for registering therein other digits dialed over said calling line subsequent to the operation of said switching apparatus to seize said one link, and additional means included in said one link and governed by the particular combination of recaptured digits registered therein for immediately selectively operating the one of said switches terminating said one link to seize one of said trunks.

9. In a telephone system, a calling line, automatic switching apparatus, a plurality of links, a plurality of automatic switches respectively terminating said links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering in said one link the particular combination of digits employed in the operation of said switching apparatus to seize said one link, means included in said one link for registering therein other digits dialed over said calling line subsequent to the operation of said switching apparatus to seize said one link, additional means included in said one link and governed by the particular combination of recaptured digits registered therein for immediately selectively operating the one of said switches terminating said one link to seize one of said trunks, and further means included in said one link for sending over said one switch and said one trunk seized thereby the digits registered in said one link.

10. In a telephone system, a calling line, automatic switching apparatus, a plurality of links, a plurality of automatic switches respectively terminating said links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering in said one link the particular combination of digits employed in the operation of said switching apparatus to seize said one link, means included in said one link for registering therein other digits dialed over said calling line subsequent to the operation of said switching apparatus to seize said one link, additional means included in said one link and governed by the particular combination of recaptured digits registered therein for immediately selectively operating the one of said switches terminating said one link to seize one of said trunks, and means responsive to the seizure of said one link for identifying said calling line and for registering the identity thereof in said one link.

11. In a telephone system, a calling line, automatic switching apparatus, a plurality of other lines, a plurality of links, a plurality of automatic switches respectively terminating said links, a plurality of trunks, means for connecting said calling line to said switching apparatus, said switching apparatus being selectively operated by the dialing over said calling line of certain combinations of digits to seize any one of said other lines and selectively operated by the dialing over said calling line of other combinations of digits to seize one of said links, means responsive to the seizure of said one link for immediately recapturing and registering in said one link the particular other combination of digits employed in the operation of said switching apparatus to seize said one link, means included in said one link for registering therein still other digits dialed over said calling line subsequent to the operation of said switching apparatus to seize said one link, and additional means included in said one link and governed by the particular other combination of recaptured digits registered therein for immediately selectively operating the one of said switches terminating said one link to seize one of said trunks.

12. In a telephone system, a calling line, automatic switching apparatus, a plurality of links, a plurality of automatic switches respectively terminating said links, a plurality of trunks, means for connecting said calling line to said switching apparatus, said switching apparatus being selectively operated by the dialing over said calling line of different combinations of digits to seize one of said links, means responsive to the seizure of said one link for immediately recapturing and registering in said one link the particular combination of digits employed in the operation of said switching apparatus to seize said one link, means included in said one link for registering therein other digits dialed over said calling line subsequent to the operation of said switching apparatus to seize said one link, and additional means included in said one link and governed entirely by said recapture means for immediately selectively operating the one of said switches terminating said one link to seize one of said trunks.

13. In a telephone system, a calling line, automatic switching apparatus, a plurality of links, a plurality of automatic switches respectively terminating said links, a plurality of trunks, means for connecting said calling line to said switching apparatus, said switching apparatus being selectively operated by the dialing over said calling line of one or more of three office code digits to seize one of said links, first means included in said one link and responsive to the seizure of said one link for immediately recapturing and registering therein the one or more of the three office code digits employed in the operation of said switching apparatus to seize said one link, second means included in said one link for subsequently registering therein the remainder of the three office code digits and a given number of numerical digits as they are dialed over said calling line subsequent to the operation of said switching apparatus to seize said one link, and additional means included in said one link and governed entirely by said recapture means for immediately selectively operating the one of said switches terminating said one link to seize one of said trunks.

14. In a telephone system, a link employed in the setting up of telephone connections and terminating in an automatic switch, an incoming trunk extending to said link and provided with a pair of line conductors and a control conductor, and a plurality of outgoing trunks accessible to said switch; said link comprising a plurality of digit registers, means including a control relay controllable over said control conductor in response to seizure of said link for immediately registering a given digit in a first of said digit registers, means including a line relay controllable over said line conductors for subsequently registering other digits in other of said digit registers, means governed by the registration of the given digit in said first digit register for immediately operating said switch to select an idle one of said outgoing trunks, and means for sending over said switch and the selected one of said outgoing trunks the given digit and the other digits respectively registered in said first and other digit registers.

15. In a telephone system, a link employed in the setting up of telephone connections and terminating in an automatic switch, an incoming trunk extending to said link and provided with a pair of line conductors and a plurality of control conductors, and a plurality of outgoing trunks accessible to said switch; said link comprising a plurality of digit registers, means including a plurality of control relays respectively controllable over said control conductors in response to seizure of said link for immediately registering corresponding different combinations of given digits in a first of said digit registers, means including a line relay controllable over said line conductors for subsequently registering other digits in other of said digit registers, means governed by the registration of different combinations of given digits in said first digit register for immediately selectively operating said switch to select an idle one of said outgoing trunks, and means for sending over said switch and the selected one of said outgoing trunks the particular combination of given digits and the other digits respectively registered in said first and other digit registers.

16. The telephone system set forth in claim 15, wherein said link is accessible to automatic switching apparatus via said incoming trunk over said pair of line conductors and any one of said control conductors, and further comprises means normally marking said link as idle to said switching apparatus over each of said control conductors, and means responsive to seizure of said link via said incoming trunk over said pair of line conductors and any one of said control conductors for marking said link as busy to said switching apparatus over each of said control conductors.

17. In a telephone system, a calling line, automatic switching apparatus, a plurality of links, a plurality of automatic switches respectively terminating said links, a plurality of groups of trunks, means for connecting said calling line to said switching apparatus, said switching apparatus being selectively operated by the dialing over said calling line of different combinations of digits to seize one of said links, means responsive to the seizure of said one link for immediately recapturing and registering in said one link the particular combination of digits employed in the operation of said switching apparatus to seize said one link, means included in said one link and selectively controlled by the registration of the recaptured digits therein for immediately selectively operating the one of said switches terminating said one link to select an idle trunk in a first of said groups of trunks, busy means included in said one link and controlled by a busy condition of each of the trunks in said first group, means included in said one link and selectively controlled jointly by said busy means and by the registration of the recaptured digits therein for immediately selectively operating said one switch to select an idle trunk in a second of said groups of trunks, means included in said one link for registering therein other digits dialed over said calling line subsequent to the operation of said switching apparatus to seize said one link, and means included in said one link for sending over said one switch and the trunk selected thereby the digits registered in said one link.

18. In a telephone system, a calling subscriber line in a calling office, a called subscriber line in a called office, each of said offices being identified by a multi-digit office code individual thereto, each of the subscriber lines in each of said offices being identified by a multi-digit directory number individual thereto, each of said offices including automatic switching apparatus and a plurality of links, a plurality of trunk lines interconnecting said offices, means for connecting said calling line to said switching apparatus in said calling office, said last-mentioned switching apparatus being operated in response to the dialing over said calling line of the office code of said called office to seize one of said links in said calling office, means resposive to the seizure of said one link by said last-mentioned switching apparatus for immediately recapturing the office code of said called office and for immediately registering the individual digits thereof employed in the operation of said last-mentioned switching apparatus in said one link, means included in said one link and responsive to the registration therein of the recaptured office code of said called office for immediately completing a connection therefrom to one of said trunk lines and for immediately sending therefrom over said one trunk line the individual digits of the office code of said called office registered therein, means included in said one link for receiving and registering therein the individual digits of the directory number of said called line subsequently dialed over said calling line subsequent to the operation of said last-mentioned switching apparatus, means included in said one link for sending therefrom over said one trunk line the individual digits of the directory number of said called line registered therein, and means controlled by the digits sent over said one trunk line for operating said switching apparatus in said called office to extend said connection to said called line.

19. In a telephone system, a calling subscriber line in a calling office, a called subscriber line in a called office, each of said offices being identified by a multi-digit office code individual thereto, each of the subscriber lines in each of said offices being identified by a multi-digit directory number individual thereto, each of said offices including automatic switching apparatus and a plurality of links, a plurality of trunk lines interconnecting said offices, means for connecting said calling line to said switching apparatus in said calling office, said last-mentioned switching apparatus being operated in response to the dialing over said calling line of the office code of said called office to seize one of said links in said calling office, means responsive to the seizure of said one link by said last-mentioned switching apparatus for identifying the directory number of said calling line and for registering the individual digits thereof in said one link, additional means resposive to the seizure of said one link by said last-mentioned switching apparatus for immediately recapturing the office code of said called office and for immediately registering the individual digits thereof employed in the operation of said last-mentioned switching apparatus in said one link, means included in said one link and responsive to the registration therein of the recaptured office code of said called office for immediately completing a connection therefrom to one of said trunk lines and for immediately sending therefrom over said one trunk line the individual digits of the office code of said called office registered therein, means included in said one link for receiving and registering therein the individual digits of the directory number of said called line subsequently dialed over said calling line subsequent to the operation of said last-mentioned switching apparatus, means included in said one link for sending therefrom over said one trunk line the individual digits of the directory number of said called line registered therein, and means controlled by the digits sent over said one trunk line for operating said switching apparatus in said called office to extend said connection to said called line.

20. In a telephone system, a calling subscriber line in a calling office, a called subscriber line in a called office, each of said offices being identified by a multi-digit office code individual thereto, each of the subscriber lines in each of said offices being identified by a multi-digit directory number individual thereto, each of said offices including automatic switching apparatus and a plurality of links, a plurailty of trunk lines interconnecting said offices, means for connecting said calling line to said switching apparatus in said calling office, said last-mentioned switching apparatus being operated in response to the dialing over said calling line of the office code of said called office to seize one of said links in said calling office, means responsive to the seizure of said one link by said last-mentioned switching apparatus for identifying the directory number of said calling line and for registering the individual digits thereof in said one link, additional means responsive to the seizure of said one link by said last-mentioned switching apparatus for immediately recapturing the office code of said called office and for immediately registering the individual digits thereof employed in the operation of said last-mentioned switching apparatus in said one link, means included in said one link and responsive to the registration therein of the recaptured office code of said called office for immediately completing a connection therefrom to one of said trunk lines and for immediately sending therefrom over said one trunk line the individual digits of the office code of said called office registered therein, means included in said one link for receiving and registering therein the individual digits of the directory number of said called line subsequently dialed over said calling line subsequent to the operation of said last-mentioned switching apparatus, means included in said one link for sending therefrom over said one trunk line the individual digits of the directory number of said called line registered therein, means controlled by the digits sent over said one trunk line for operating said switching apparatus in said called office to extend said connection to said called line, and means included in said one link and responsive to the release of said connection for producing a record therein of said registrations therein and including the directory number of said calling line and the office code of said called office and the directory number of said called line.

References Cited in the file of this patent

UNITED STATES PATENTS

| | | |
|---|---|---|
| 2,300,829 | Gooderham | Nov. 3, 1942 |
| 2,301,015 | Busch | Nov. 3, 1942 |
| 2,408,433 | Malthaner | Oct. 1, 1946 |
| 2,447,533 | Retallack | Aug. 24, 1948 |
| 2,484,612 | Dehn | Oct. 11, 1949 |
| 2,513,112 | Shepherd | June 27, 1950 |
| 2,522,090 | Shepherd | Sept. 12, 1950 |
| 2,562,717 | Holden | July 31, 1951 |
| 2,594,495 | Retallack | Apr. 29, 1952 |
| 2,603,715 | Vaughan | July 15, 1952 |
| 2,629,016 | Gooderham | Feb. 17, 1953 |
| 2,678,968 | Gooderham | May 18, 1954 |
| 2,739,184 | Baird et al. | Mar. 20, 1956 |

UNITED STATES PATENT OFFICE

CERTIFICATE OF CORRECTION

Patent No. 2,851,531 September 9, 1958

Douglas O. Baird et al.

It is hereby certified that error appears in the printed specification of the above numbered patent requiring correction and that the said Letters Patent should read as corrected below.

Column 42, line 33, for "line", second occurrence, read -- link --.

Signed and sealed this 2nd day of December 1958.

(SEAL)

Attest:

KARL H. AXLINE

Attesting Officer

ROBERT C. WATSON

Commissioner of Patents